United States Patent
Lee et al.

(10) Patent No.: US 8,948,566 B2
(45) Date of Patent: Feb. 3, 2015

(54) DIGITAL SIGNAGE APPARATUS AND METHOD USING THE SAME

(75) Inventors: Jaeil Lee, Seoul (KR); Yunjueng Mhun, Seoul (KR); Yunjung Kim, Gyeonggi-Do (KR); Hyunsun Lyu, Seoul (KR); Hyojung Lee, Seoul (KR); Hyejin Choi, Yongin-Si (KR); Hyeeun Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/521,633

(22) PCT Filed: Oct. 5, 2010

(86) PCT No.: PCT/KR2010/006806
§ 371 (c)(1),
(2), (4) Date: Jul. 11, 2012

(87) PCT Pub. No.: WO2011/087204
PCT Pub. Date: Jul. 21, 2011

(65) Prior Publication Data
US 2013/0136412 A1 May 30, 2013

(30) Foreign Application Priority Data

Jan. 12, 2010 (KR) .................. 10-2010-0002859
Jan. 13, 2010 (KR) .................. 10-2010-0003252
Jan. 14, 2010 (KR) .................. 10-2010-0003596

(51) Int. Cl.
*H04N 5/932* (2006.01)
*H04N 5/775* (2006.01)
*H04M 3/487* (2006.01)

(52) U.S. Cl.
CPC ............. *H04N 5/775* (2013.01); *H04M 3/4878* (2013.01); *H04M 2203/2072* (2013.01)
USPC .......................................... 386/219; 386/200

(58) Field of Classification Search
None
See application file for complete search history.

(56) References Cited

U.S. PATENT DOCUMENTS

| | | | |
|---|---|---|---|
| 2002/0154246 A1* | 10/2002 | Hawkins ....................... | 348/465 |
| 2006/0247983 A1 | 11/2006 | Dalli | |
| 2007/0011050 A1 | 1/2007 | Klopf et al. | |
| 2008/0097824 A1 | 4/2008 | Julien et al. | |
| 2009/0198823 A1 | 8/2009 | Bannister et al. | |
| 2009/0241145 A1* | 9/2009 | Sharma ........................... | 725/43 |
| 2010/0192206 A1* | 7/2010 | Aoyama .......................... | 726/5 |

FOREIGN PATENT DOCUMENTS

| | | |
|---|---|---|
| CN | 101504811 A | 8/2009 |
| KR | 10-2009-0085507 A | 8/2009 |

* cited by examiner

*Primary Examiner* — William C Vaughn, Jr.
*Assistant Examiner* — Eileen Adams
(74) *Attorney, Agent, or Firm* — Birch, Stewart, Kolasch & Birch, LLP

(57) ABSTRACT

Disclosed is a digital signage apparatus of allowing the user to intuitively and easily manage content information, and a control method thereof. For this purpose, the digital signage apparatus may include a display unit configured to display content files, and a controller configured to display a first content file selected from the content files on a time cell region of a scheduler displayed on the display unit.

19 Claims, 24 Drawing Sheets

DIGITAL SIGNAGE APPARATUS AND METHOD USING THE SAME

TECHNICAL FIELD

The present invention relates to a digital signage apparatus and a method thereof.

BACKGROUND ART

In general, digital signage is a digital image apparatus (or electronic billboard) for providing broadcast programs, specific information (including moving images, etc.), and the like.

DISCLOSURE OF INVENTION

Solution to Problem

A control device of a digital signage apparatus according to an embodiment of the present invention may include a display unit configured to display contents; a controller configured to display a first content selected from the contents on a time cell region of a scheduler displayed on the display unit, wherein the scheduler may schedule the selected first content.

As an example associated with the present invention, the controller may move the selected first content to a specific location within the time cell region.

As an example associated with the present invention, the specific location within the time cell region may indicate a specific date and a specific time within the time cell region.

As an example associated with the present invention, the controller may set up a duration of the displayed first content.

As an example associated with the present invention, the controller may set up the duration by adjusting the size of the time cell region in which the first content is located.

As an example associated with the present invention, the controller may set up the duration by adjusting the size of the first content located in the time cell region.

As an example associated with the present invention, the controller may display a thumbnail image and/or summary information on the first content within the time cell region.

As an example associated with the present invention, the summary information may include at least one of a player name, a type of the player, a resolution of the player, a size of the player, a kind of library, a title of content, a resolution of the content, a size of the content, a play time of the content, and a creation date of the content.

As an example associated with the present invention, the controller may disable a time cell region prior to a current date among a plurality of dates included in the time cell region.

As an example associated with the present invention, the controller may display date and time information on the display unit if a first content displayed within the time cell region is selected, and display the first content in a time cell region corresponding to the selected first date and first time information if first date and first time information is selected from the displayed date and time information.

A method of controlling a digital signage apparatus according to the present invention may include displaying contents on a display unit; displaying a first content selected from the contents on a time cell region of a scheduler displayed on the display unit, wherein the scheduler may schedule the selected first content.

A control device of a digital signage apparatus according to the present invention may include a display unit configured to display a scheduler; and a controller configured to display content information on a time cell region of the scheduler, wherein the controller may display an edit window for editing the content on the display unit when the content information is selected.

A control device of a digital signage apparatus according to the present invention may include a display unit configured to display an edit region of content and a distribution object selection region of the content on a scheduler; and a controller configured to transmit the content to a first distribution object of one or more distribution objects displayed on the distribution object selection region of the content through a communication unit.

A control device of a digital signage apparatus according to the present invention may include a display unit configured to display an selection region of content and a distribution object selection region of the content; and a controller configured to transmit a first content selected from one or more contents displayed on the selection region of the content to a first distribution object selected from one or more distribution objects displayed on the distribution object selection region of the content through a communication unit.

A control device of a digital signage apparatus according to an embodiment of the present invention may include a first display unit configured to display contents; a controller configured to display a first content selected from the contents on a time cell region of a scheduler displayed on the first display unit, and transmit the first content through a communication network; and a second display unit configured to display the first content transmitted through the communication network, wherein the scheduler may schedule the selected first content.

An apparatus according to an embodiment of the present invention may receive contents scheduled in a time cell region of a scheduler, and display the received contents during a period indicated by the time cell region.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Figure 1:
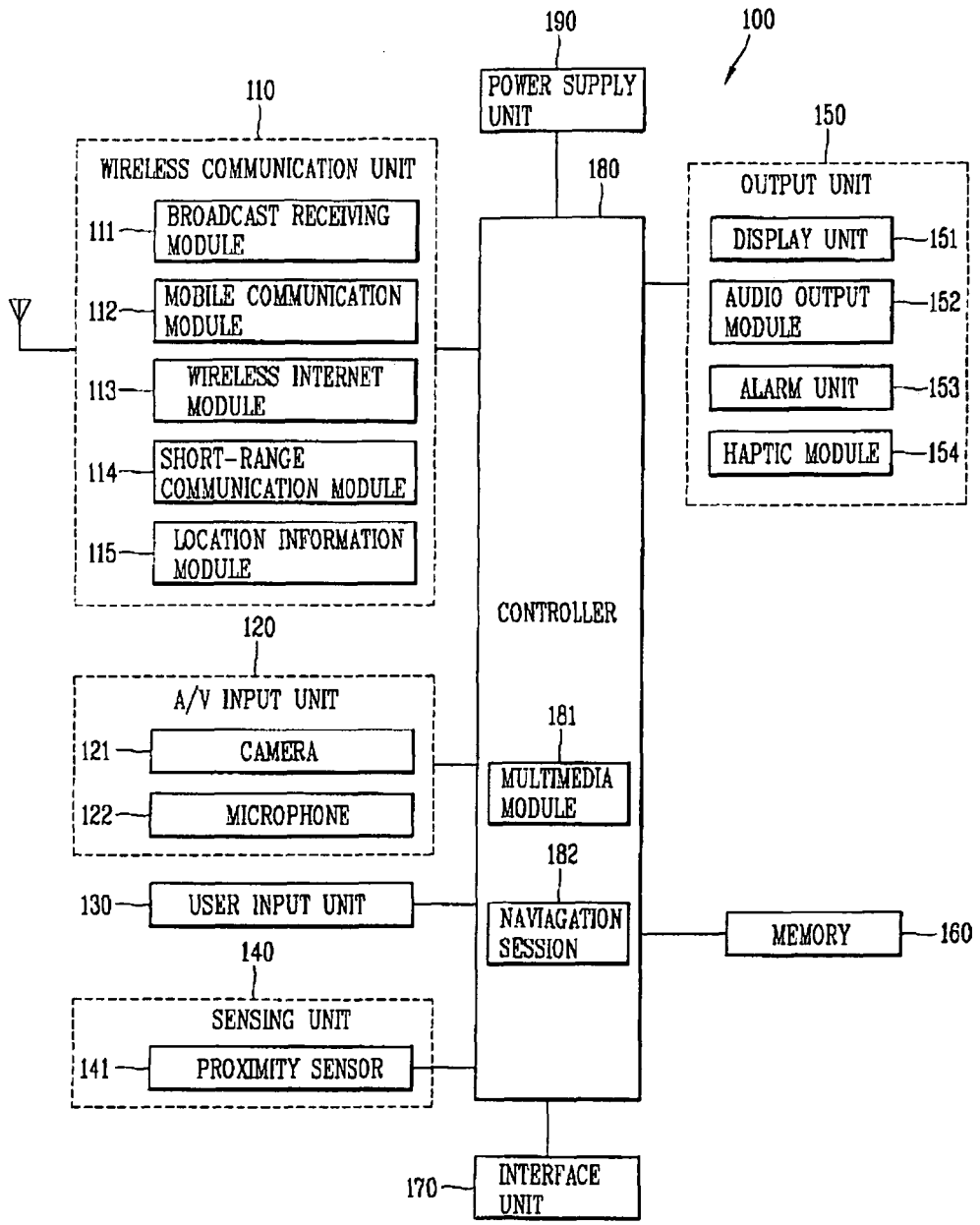
FIG. 1 is a block diagram illustrating the configuration of a mobile terminal to which a digital signage apparatus according to an embodiment of the present invention is applied.

Hereinafter, embodiments of the present invention will be described in detail with reference to the accompanying drawings, and the same or corresponding elements are designated with the same numeral references regardless of the numerals in the drawings and their redundant description will be omitted.

FIG. 1 is a block diagram illustrating the configuration of a mobile terminal to 100 which a digital signage apparatus according to an embodiment of the present invention is applied.

The mobile terminal 100 may be implemented in various forms. For example, there are mobile terminals 100 such as portable phone, smart phone, notebook computer, digital broadcast terminal, personal digital assistant (PDA), portable multimedia player (PMP), navigation (vehicle navigation device) and the like.

As illustrated in FIG. 1, the mobile terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. All the elements of the mobile terminal 100, as illustrated in FIG. 1, are not necessarily required, and therefore, the mobile terminal 100 may be implemented with greater or less elements than the elements as illustrated in FIG. 1.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast associated information may mean information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 means a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal. A GPS module is an example. The GPS module receives location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system may be applicable.

The A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 (or other storage medium) or transmitted through the wireless communication unit 110. Two or more cameras 121 may be provided according to the configuration type and/or use environment of the mobile terminal. The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, the presence or absence of user contact, an orientation of the mobile terminal 100, an acceleration or deceleration movement of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, whether or not an external device is coupled with the interface unit 170. On the other hand, the sensing unit 140 may include a proximity sensor 141.

The output unit 150 is configured to provide an output for audio signal (or signal related to auditory sense), video signal, or alarm signal, and the output unit 150 may include the display unit 151, an audio output module 152, an alarm unit 153, a haptic module 154, and the like.

The display unit 151 may display (or output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a Field Emission Display (FED), and a three-dimensional (3D) display. There may exist two or more display units 151 according to its embodiment. For example, an external display unit (not shown) and an internal display unit (not shown) are simultaneously provided in the mobile terminal 100. Some of those displays may be configured with a transparent or optical transparent type to allow viewing of the exterior through the display unit, which may be called transparent displays. An example of the typical transparent displays may include a transparent LCD (TOLED), and the like. The rear structure of the display unit 151 may be also configured with an optical transmissive structure. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface (same surface) to be spaced apart from or integrated with each other, or may be arranged on different surfaces.

On the other hand, if the display unit 151 and a touch sensitive sensor (referred to as a touch sensor) constitutes an interlayer structure (hereinafter, referred to as a "touch screen"), the display unit 151 may be used as an input device rather than an output device. The touch sensor may be implemented as a touch film, a touch sheet, a touch pad, and the like.

Furthermore, the touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signal(s) are transmitted to a touch controller (not shown). The touch controller processes the signal(s), and then transmits corresponding data to the controller 180. Accordingly, the controller 180 may sense which region of the display unit 151 has been touched.

The proximity sensor 141 may be arranged in an inner region of the mobile terminal 100 surrounded by a touch screen or may be arranged adjacent to the touch screen. The proximity sensor 141 is a sensor for detecting the presence or absence of an object approaching to a certain detection surface or an object that exists nearby by using the force of electromagnetism or infrared rays without a mechanical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is an electrostatic type, the approach of a pointer can be detected based on a change in a field according to the approach of the pointer. In this case, the touch screen (touch sensor) may be classified as a proximity sensor.

In the following description, for the sake of brevity, recognition of the pointer positioned to be close to the touch screen, although the pointer is not actually brought into contact with the touch screen, will be called a "proximity touch", while recognition of actual contacting of the pointer on the touch screen will be called a "contact touch". The position where the pointer is proximately touched on the touch screen means a position where the pointer is positioned to correspond vertically to the touch screen when the pointer is proximately touched.

Furthermore, the proximity sensor 141 can detect a proximity touch, and a proximity touch pattern (for example, a proximity touch distance, a proximity touch direction, a proximity touch speed, a proximity touch time, a proximity touch position, a proximity touch movement state, or the like). Information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may output an audio signal associated with the function performed by the mobile terminal 100 (for example, a call signal reception sound, a message reception sound, etc.). The audio output module 152 may include a receiver, a speaker, a buzzer, and the like.

The alarm unit 153 may output a signal to notify the occurrence of an event of the mobile terminal 100. Examples of the event occurred in the mobile terminal 100 may include call signal reception, message reception, a key signal input, a touch input, and the like. In addition to an audio or video output, the alarm unit 153 may output a signal in a different manner to notify the occurrence of an event. For example, the alarm unit 153 may output in the form of a vibration. When a call signal or message is received, the alarm unit 153 may vibrate the mobile terminal 100 through vibration means. When a key signal is inputted, the alarm unit 153 may vibrate the mobile terminal 100 through vibration means using a feedback to the key signal input. The user can recognize an occurrence of the through vibration as described above. The signal for notifying an occurrence of the event may be outputted through the display unit 151 or the audio output module 152, and thus they 151, 152 may be classified part of the alarm unit 153.

The haptic module 154 generates various tactile effects felt by the user. A typical example of the tactile effects generated by the haptic module 154 is vibration. Intensity, pattern, or the like, generated by the haptic module 154 can be controlled. For example, different vibrations may be combined and outputted or sequentially outputted.

The haptic module 154, in addition to vibration, may generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module 154 may be implemented to feel a tactile effect through muscular senses by a finger or arm of the user as well as to transfer a tactile effect through direct contact. There may exist two or more haptic modules 154 according to its configuration.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, an optical disk, and the like. Also, the mobile terminal 100 may run a web storage that performs the storage function of the memory 160 over the Internet, or operate in association with the web storage.

The interface unit 170 serves as an interface to every external device that may be connected with the mobile terminal 100. For example, the interface unit 170 may include a wired or wireless headset port, an external battery charger port, a wired or wireless data port, a memory card port, a ports for connecting a device having an identification module, an audio input/output (I/O) port, an video input/output (I/O) port, an earphone port, and the like. Here, the identification module, as a chip that stores various information for authenticating the authority to use the mobile terminal 100, may include a user identity module (UIM), a subscriber identity module (SIM), a universal subscriber identity module (USIM), and the like. In addition, the device having the identification module (hereinafter, 'identifying device') may be made in a form of smart card. Accordingly, the identifying device may be connected with the mobile terminal 100 through a port. The interface unit 170 is provided to receive data or power from an external device and transfer the received data or power to every element within the mobile terminal 100 or may be used to transfer data within the mobile terminal to an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal 100 therethrough. Various command signals or the power inputted from the cradle may operate as a signal for recognizing when the mobile terminal is properly mounted on the cradle.

The controller 180 typically controls a general operation of the mobile terminal 100. For example, the controller 180 performs a control and processing operation associated with a voice call, a data communication, a video phone call, and the like. In addition, the controller 180 may include a multimedia module 181 for reproducing multimedia content. The multimedia module 181 may be provided within the controller 180 or may be separately provided from the controller 180.

The controller 180 may perform a pattern recognition processing to recognize a handwriting or picture-drawing input performed on the touch screen as a character or image, respectively.

The power supply unit 190 receives external or internal power to supply the power required for an operation of each element under a control of the controller 180.

The function of an element applied to the mobile terminal 100 may be implemented in a computer-readable medium using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, electronic units designed to perform the functions described herein. In some cases, such embodiments may be implemented in the controller 180. For software implementation, the embodiments such as procedures or functions may be implemented together with separate software modules that allow performing of at least one function or operation. Software codes can be implemented by a software application written in any suitable programming language. Also, the software codes may be stored in the memory 160 and executed by the controller 180. A navigation session 182 applied to the mobile terminal 100 provides a typical navigation function.

On the other hand, the controller 180 applied to the mobile terminal 100 according to an embodiment of the present invention edits a schedule using a drag-and-drop function when editing the schedule using one or more contents (for example, media files or canvas files).

Furthermore, the controller 180 applied to the mobile terminal 100 according to an embodiment of the present invention provides an edit disable state for the contents with expiration dates when editing the schedule.

Furthermore, the controller 180 applied to the mobile terminal 100 according to an embodiment of the present invention provides a repeat function in the time cell unit.

Figure 2:
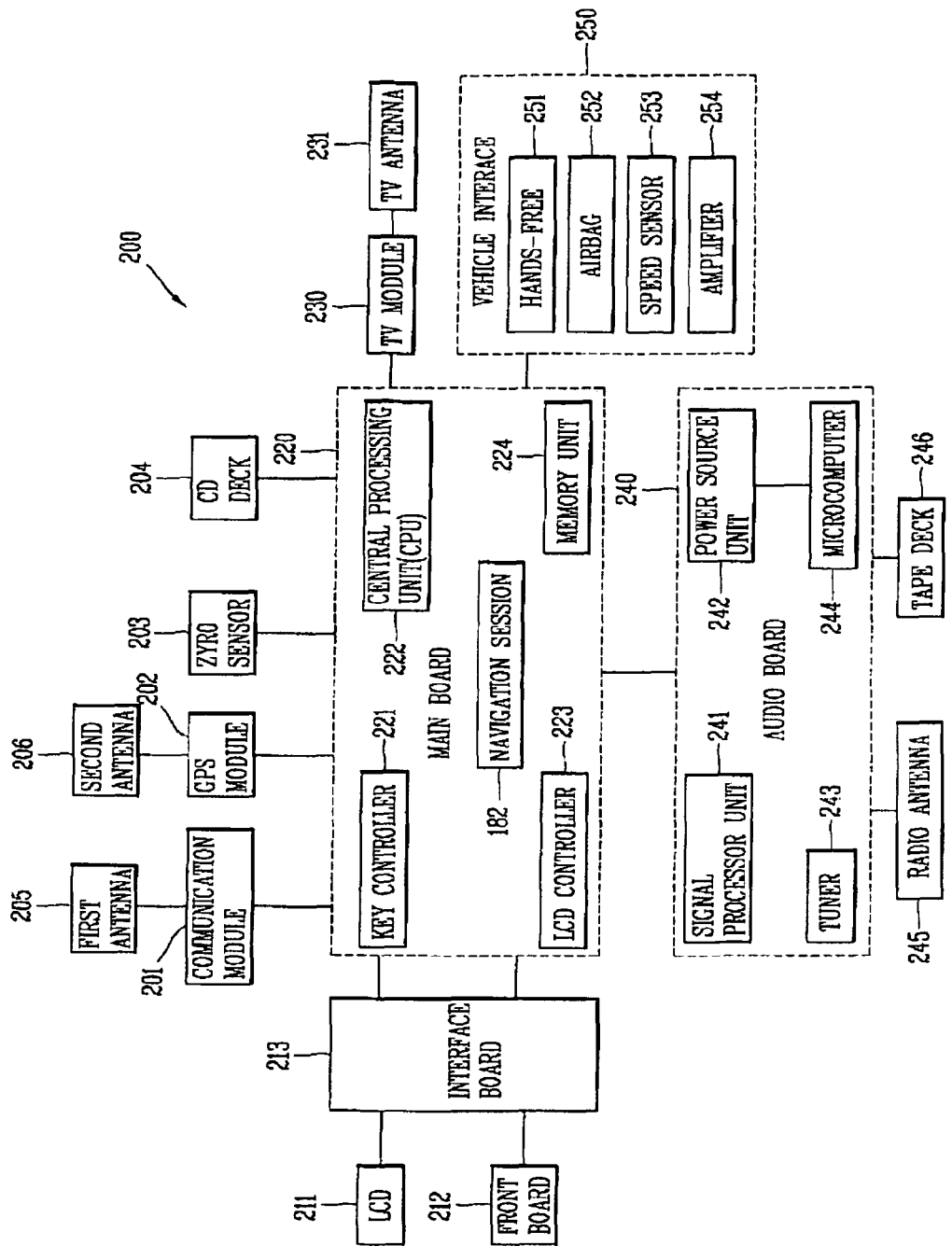
FIG. 2 is a block diagram illustrating the configuration of a telematics terminal to which a digital signage apparatus according to embodiments of the present invention is applied.

FIG. 2 is a block diagram illustrating a configuration of a telematics terminal 200 to which a digital signage apparatus according to an embodiment of the present invention is applied, and as illustrated herein, it is configured by including a main board 220 in which a central processing unit (CPU) 222 for controlling overall operation of the telematics terminal 200, a key controller 221 for controlling various key signals, a LCD controller 223 for controlling a LCD, and a memory 224 for storing various information are provided therein.

The memory 224 stores map information (map data) for displaying vehicle guidance information (road guidance information for the user while driving or not driving) on a map of the display unit (or LCD) 211.

Also, the memory 224 stores a traffic information collection control algorithm for receiving traffic information based upon road conditions when a vehicle is currently driving and various information for controlling the algorithm.

The main board 220 is configured by including a communication module 201 for performing a voice call and data transmission and/or reception through a mobile terminal given with its unique equipment number and mounted on a vehicle, a GPS module 202 for receiving GPS signals for vehicle location guidance, driving route tracking from the origin to the destination, and the like, and generating current location data of the vehicle based upon the received GPS signals or transmitting traffic information collected by the user as GPS signals, a gyro sensor 203 for detecting a driving direction of the vehicle, and a CD deck 204 for reproducing a signal written on a compact disk (CD).

Furthermore, the communication module 201 and the GPS module 202 transmits and/or receives through a first antenna 205 and a second antenna 206, respectively.

Furthermore, the main board 220 is connected to a TV module 230 for receiving a broadcast signal through a broadcast signal antenna (or TV antenna).

Furthermore, the main board 220 is connected to a display unit (liquid crystal display, LCD) 211 controlled by the LCD controller 223 through an interface board 213.

The LCD 211 displays a broadcast signal received through the TV module 230, after performing a predetermined signal processing procedure, as a video signal through the interface board 213 by a control of the LCD controller 223, and audio signal is outputted through an amplifier 254 by a control of an audio board 240, which will be described later. In addition, the LCD 211 displays various video and text signals based upon a control signal of the LCD controller 223.

Furthermore, the LCD 211 may be configured to receive an input from the user using a touch screen method.

Furthermore, the main board 220 is connected to a front board 212 controlled by the key controller 221 through the interface board 213. The front board 212 configures buttons and menus for inputting various key signals, and provides a key signal corresponding to the key (or button) selected by the user to the main board 220. Furthermore, the front board 212 is provided with menus keys for directly inputting traffic information, and the menu keys may be configured to be controlled by the key controller 221.

The audio board 240 is connected to the main board 220 to process various audio signals. The audio board 240 is configured by including a microcomputer 244 for controlling the audio board 240, a tuner 243 for receiving radio signals through an antenna (or radio antenna) 245, a power supply unit 242 for supplying power to the microcomputer 244, and a signal processing unit 241 for performing a signal processing operation to output various audio signals.

Furthermore, the audio board 240 is connected to a radio antenna 245 for receiving radio signals, and a tape deck 246 for reproducing an audio tape.

Furthermore, the audio board 240 is connected to an amplifier 254 for outputting audio signals that are signal-processed in the audio board 240.

The amplifier 254 is connected to a vehicle interface 250. In other words, the main board 220 and the audio board 240 are respectively connected to the vehicle interface 250. Furthermore, the vehicle interface 250 may be connected to a hands-free 251 for inputting an audio signal without using vehicle driver's hands, airbag 252 for providing passenger's safety, and a speed sensor 253 for detecting the speed of a vehicle.

Furthermore, the speed sensor 253 calculates the speed of a vehicle, and provides the calculated vehicle speed information to the central processing unit 222.

Furthermore, a navigation session 182 applied to the telematics terminal 200 provides typical navigation functions.

On the other hand, the central processing unit 222 applied to the telematics terminal 200 according to an embodiment of the present invention edits a schedule using a drag-and-drop function when editing the schedule using one or media files or canvas files.

Furthermore, the central processing unit 222 applied to the telematics terminal 200 according to an embodiment of the present invention provides an edit disable state for the contents with expiration dates when editing the schedule.

Furthermore, the central processing unit 222 applied to the telematics terminal 200 according to an embodiment of the present invention provides a repeat function in the time cell unit.

Figure 3:
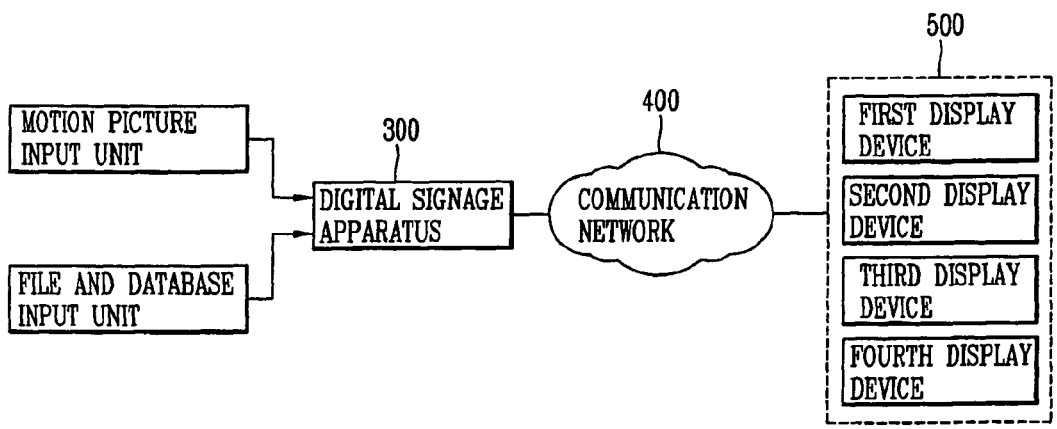
FIG. 3 is a configuration diagram illustrating the configuration of a digital signage system according to an embodiment of the present invention.

FIG. 3 is a configuration diagram illustrating the configuration of a digital signage system 10 according to an embodiment of the present invention.

As illustrated in FIG. 3, a digital signage system 10 may include a digital signage apparatus 300, a communication network 400, and one or more display devices 500.

The digital signage apparatus 300 receives and stores one or more contents transmitted from a plurality of motion picture input units, file and database input units, universal serial buses (USB), and the like connected by using a wireless/wired communication method. At this time, the contents may include a media file and a canvas (or content) file. Here, the media file may include a picture file (including gif, jpg, tif, etc.), a video file (including avi, wmv, etc.), a flash file (including swf, etc.), a document file (including pdf, doc, hwp, etc.), and the like. Also, the canvas file is a bundle of media that can be created by a content editor (or, canvas editor), which is a file in which media files are configured with a plurality of zones (for example, four media files are configured to be located in four split windows) based on the resolution of a player. Also, the media file and the canvas file are provided with a unit for configuring a time cell in a scheduler zone.

Furthermore, the digital signage apparatus 300 performs the function of a server or manager part. In other words, the digital signage apparatus 300 performs scheduling for the information to be outputted to each client using the plurality of contents for one or more clients (including the one or more display devices 500) connected to the digital signage apparatus 300 (or registered in the digital signage apparatus 300). At this time, the digital signage apparatus 300 may perform scheduling with a predetermined time interval (for example, one hour interval) based on time base when performing the scheduling.

In addition, the digital signage apparatus 300 transmits scheduling information (or execution result information of the scheduling) and related contents (including media files, canvas files, and the like) to the one or more display devices 500 through the communication network 400.

The display device 500 receives scheduling information and related contents transmitted from the digital signage apparatus 300.

The display device 500 performs the function of a client or display part. In other words, the display device 500 outputs (display) related contents according to the relevant time based on the received scheduling information.

The display device 500 may include at least one of a Liquid Crystal Display (LCD), a Thin Film Transistor-LCD (TFT-LCD), an Organic Light Emitting Diode (OLED) display, a flexible display, a Field Emission Display (FED), and a three-dimensional (3D) display.

The display device 500 may include a second communication unit (not shown), a second controller (not shown), a second storage unit (not shown), a second input unit (not shown), and the like within the display device 500, and may directly perform the function of the digital signage apparatus 300 based on the control of the second controller provided therein. In other words, the second controller included in the display device 500 may receive one or more contents transmitted from a plurality of motion picture input units, file and database input units, universal serial buses (USB), and the like connected by using a wireless/wired communication method, perform scheduling based on the received contents, and output related contents at the relevant time based on the performed scheduling information through the display device 500. Also, if the second controller creates scheduling information, then related information (including scheduling information) may be transmitted to the digital signage apparatus 300 using the second communication unit.

The display device 500 may transmit same contents displayed on the display device 500 to one or more mobile terminals adjacent to the display device 500 within a predetermined range using a local area network or the like. The one or more mobile terminals may receive contents transmitted from the display device 500, and display the received contents on a display unit provided in the one or more mobile terminals. Also, the display device 500 may transmit same contents displayed on the display device 500 to any other display units located within a predetermined range of the display device 500 using a local area network or the like.

The digital signage apparatus 300 or the display device 500 may include a smart phone, a portable terminal, a mobile terminal, a PDA (Personal Digital Assistants), a notebook computer, a Wibro terminal, an IPTV (Internet Protocol Television) terminal, a television, a telematics terminal, a navigation terminal, an AVN (Audio Video Navigation) terminal, an information providing server, a call center, and the like.

The communication network 400 connects between terminals (for example, the digital signage apparatus 300 or the display device 500) in a short-range or long-range using a wireless Internet module, a short-range communication module, or the like. Here, the wireless Internet technology may include WLAN (Wireless LAN), Wi-Fi, Wibro (Wireless Broadband), Wimax (World Interoperability for Microwave Access), HSDPA (High Speed Downlink Packet Access), IEEE 802.16, LTE (Long Term Evolution), WMBS (Wireless Mobile Broadband Service), and the like. Also, The short-range communication technology may include Bluetooth, Radio Frequency IDentification (RFID), Infrared Data Association (IrDA), Ultra WideBand (UWB), ZigBee, or the like.

Figure 4:
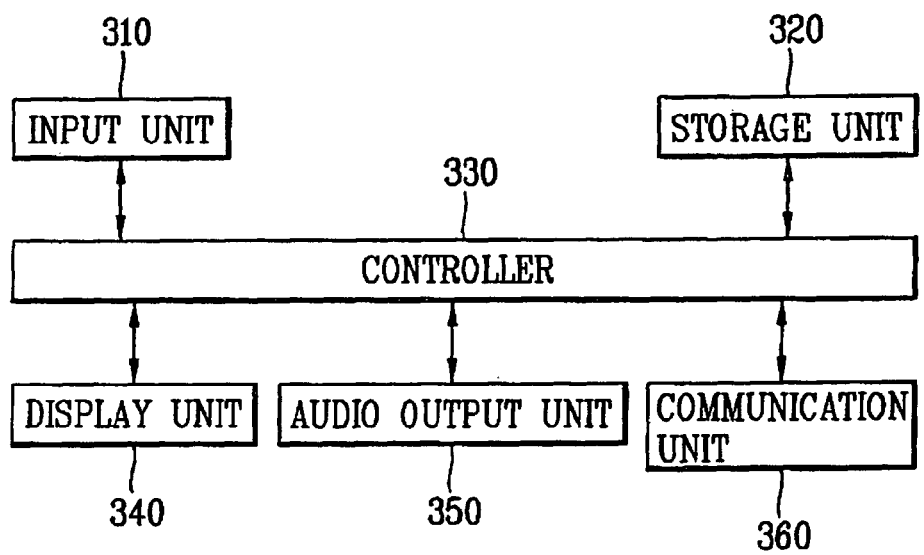
FIG. 4 is a block diagram illustrating the configuration of a digital signage apparatus according to an embodiment of the present invention.

FIG. 4 is a block diagram illustrating the configuration of a digital signage apparatus 300 according to an embodiment of the present invention.

As illustrated in FIG. 4, the digital signage apparatus 300 may include an input unit 310, a storage unit 320, a controller 330, a display unit 340, an audio output unit 350, and a communication unit 360.

The input unit 310 receives a button manipulation by the user or receives a command or control signal by the manipulation of touching/scrolling the displayed window.

The input unit 310 allows the user to select his or her desired function or receive information, and various devices may be used such as a keypad, a touch screen, a jog shuttle, a microphone, and the like.

The storage unit 320 stores data, programs and the like which are required for operating the digital signage apparatus 300.

The storage unit 320 stores various user interfaces (UIs) and/or graphic user interfaces (GUIs).

The storage unit 320 stores contents such as media files, canvas files or the like received from the communication unit 360.

The storage unit 320 stores scheduling information generated (or configured) by the controller 330. At this time, the scheduling information may include information on a terminal (or display unit) for receiving the scheduling information.

The storage unit 320 may include at least one type of storage medium including a flash memory type, a hard disk type, a multimedia card micro type, a card-type memory (e.g., SD or DX memory, etc), a Read-Only Memory (ROM), an Electrically Erasable Programmable Read-Only Memory (EEPROM), a Programmable Read-Only Memory (PROM), a Random Access Memory (RAM), a Static Random Access Memory (SRAM), a magnetic memory, a magnetic disk, an optical disk, and the like.

The controller 330 may control the overall operations of the digital signage apparatus 300.

The controller 330 may select any one constituent element from a period selection region including today, day, week, month, quarter, year, and the like to perform scheduling in the unit of today/day/week/month/quarter/year.

The controller 330, when in the edit mode (scheduling mode), moves (copies, or displays) any one file selected from a plurality of media files or a plurality of canvas files displayed on the display unit 340 to any location within a time cell region (a time cell region of the scheduler) in the library region of the display unit 340 using a drag-and-drop function.

For any location within the time cell region in which the file is located, the controller 330 adjusts the upper/lower/left/right size of a time cell region corresponding to the any location, thereby setting up a duration of the file.

The controller 330 may be configured to check today's date, and to disable the content displayed on the display unit 340 for the date prior to today's date, and not to allow to perform a scheduling edit function such as modification/deletion/addition and the like for a time cell region included in the prior date.

The controller 330 may be configured to automatically delete medial files or canvas files included in a time cell region of the prior date, when a preset predetermined time period has been passed, for the medial files or canvas files included in the prior date.

The controller 330 performs a repeat function for the file if a preset function (for example, a preset button) is selected for the file located at any location within the time cell region (time cell region of the scheduler). In other words, the controller 330 repeats (or copy) the file at the same time zone where the file is located in a time cell region among a plurality of time zones included in at least one date if the preset button is selected in a state that the file is selected.

When the file is copied to at least one or more dates by a repeat function, the controller 330 selects a single file or a plurality of files from the files included in the one or more dates respectively, and deletes the selected single file or plurality of files if a delete function for the selected file is performed. In other words, when the file is copied to at least one or more dates, the controller 330 may delete part or all for the each copied file.

If the file is modified (including time zone modification, file content modification, etc.) when the file is copied to at least one or more dates by a repeat function, then the controller 330 may be configured to reflect (or apply) the content of the modified file to one or more files included in the at least one or more dates respectively. The display unit 340 displays the operating state of each constituent element included in the digital signage apparatus 300 by a control of the controller 330.

The display unit 340 displays the execution result of an application program previously stored in the storage unit 320 by a control of the controller 330. Here, the display unit 340 may be configured to receives an input from the user using a touch screen method.

The display unit 340 may display various contents such as various menu windows using a user interface and/or a graphic user interface included in the storage unit 320 when displaying the execution result of the application program. Here, the contents displayed on the display unit 340 may include various texts or image data (including map data or various information data) and icons, a list menu, a menu window including combo boxes, and the like.

The display unit 340 may include at least one of a Liquid Crystal Display (LCD), a Thin Film Transistor-LCD (TFT-LCD), an Organic Light Emitting Diode (OLED) display, a flexible display, a Field Emission Display (FED), and a three-dimensional (3D) display.

The audio output unit 350 outputs audio information included in a signal processed by the controller 330. Here, the audio output unit 350 may be a speaker.

The audio output unit 350 outputs audio information included in the execution result of an application program by a control of the controller 330.

In this manner, the controller 330 may select one or more files from the files in a library region using a drag-and-drop function to move (copy) the file to a time cell region. Furthermore, in this manner, the controller 330 may be configured to display the window configuration shown in a window differently for the date (list) prior to today's date, and also not to allow to edit for a time cell region included in the prior date. In addition, in this manner, the controller 330 may perform a repeat function to one or more other time cell regions in the unit of time cell region.

Hereinafter, a method of controlling a digital signage apparatus according to an embodiment of the present invention will be described in detail with reference to FIGS. 1 through 6H.

Figure 5:
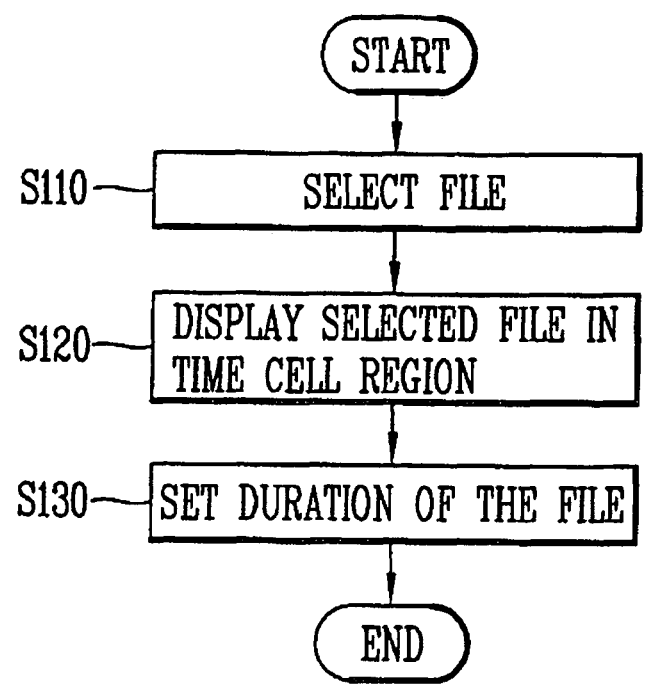
FIG. 5 is a flow chart illustrating a method of controlling a digital signage apparatus according to an embodiment of the present invention.

FIG. 5 is a flow chart illustrating a method of controlling a digital signage apparatus (or data scheduling apparatus) according to an embodiment of the present invention.

First, the input unit 310 (or display unit 340) selects any one file selected by the user from a plurality of media files or a plurality of canvas files (or content files) displayed on the display unit 340 when in the edit mode (scheduling mode). Here, the media file may include a picture file (including gif, jpg, tif, etc.), a video file (including avi, wmv, etc.), a flash file (including swf, etc.), a document file (including pdf, doc, hwp, etc.), and the like. Also, the canvas file is a bundle of media that can be created by a content editor (or, canvas editor), which is a file in which media files are configured with a plurality of zones (for example, four media files are configured to be located in four split windows) based on the resolution of a player.

Figure 6:
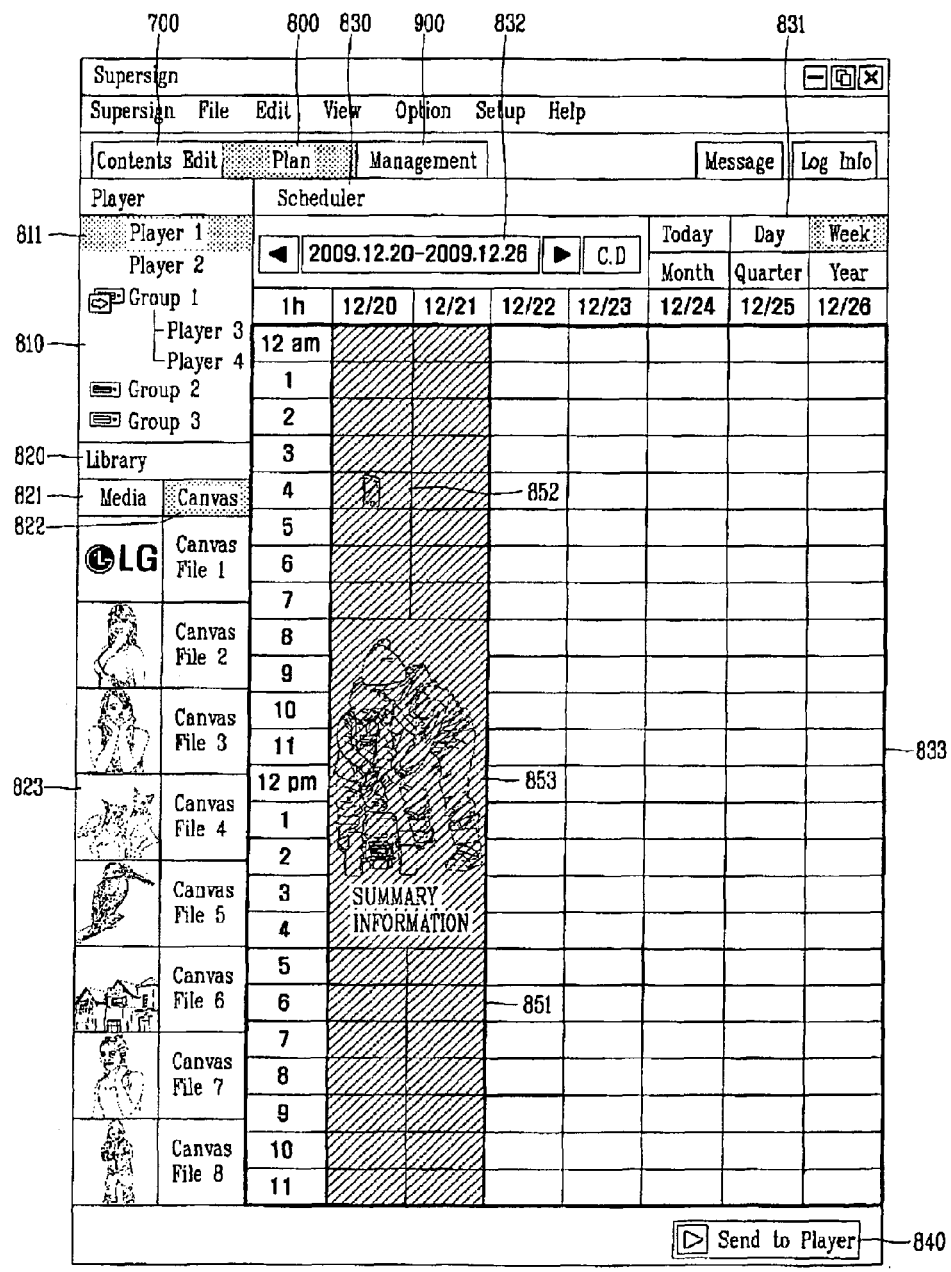
FIGS. 6 through 13 are views illustrating a scheduling window of the display unit according to an embodiment of the present invention.

As illustrated in FIG. 6, the controller 330 executes an application program previously stored in the storage unit 320, and displays the execution result on the display unit 340. At this time, an execution result window displayed on the display unit 340 may include a contents edit menu 700 which is a menu for editing contents, a plan menu 800 which is a menu for setting up scheduling using contents, a management menu 900 for managing the distribution objects of contents and monitoring a reproduction state, and the like. Also, the plan menu 800 may include a player region (or player window) 810, a library region (or library window) 820, a scheduler region (or scheduler window) 830, a button (for example, "send to player button") 840 for transmitting information on a prepared schedule to a related (or activated) player (or group). Here, the player region 810 includes information on one or more players, or one or more groups and at least one player included in the groups respectively. At this time, the player may be an electronic billboard (or an electronic advertising device, or a display device, or any other digital signage apparatus) that is communication-connected to the digital signage system 100 to output information using the information for scheduling transmitted from the digital signage system 100 and the related information (including media files, canvas files, etc.). Furthermore, the controller 330 may perform create/modify/delete functions for a player or group displayed on the player region 810. In addition, the library region 820 may include a tab (or menu) 821 for selecting a media file, a tab 822 for selecting a canvas file, a region 823 for displaying one or more files included in the media file tab 821 or the canvas file tab 822 respectively. Furthermore, the scheduler region 830 may include a period selection region 831 including today, day, week, month, quarter, year, and the like, and a period display region 832 for displaying the period for scheduling, a time cell (or time line) region 833 for scheduling contents selected by the user.

If the plan menu is selected from a plurality of menus displayed on the display unit 340 and a specific player within a specific group is selected, then the controller 330 displays a window for scheduling corresponding to the selected player on a partial region of the display unit 340. In other words, if the plan menu 800 is selected from a plurality of menus 700, 800, 900 displayed on the display unit 340 and "Player 1" 811 is selected from the player region 810 as illustrated in FIG. 6, then the controller 330 displays a scheduler window 830 for scheduling corresponding to the selected "Player 1" 811 and the library window 820 on the display unit 340.

The controller 330 may display prior dates on the basis of today's date (or preset date) with a different state (for example, displayed with gray color, displayed with slant lines, displayed with focus off, etc.) from dates subsequent to today's date in a time cell region displayed on the display unit 340.

The controller 330 may disable modification/deletion (or edition) for any (specific) media files included the prior dates, and disable the addition of a new media file or canvas file.

For example, if today's date is Dec. 22, 2009 in a time cell region displayed on the display unit 340 as illustrated in FIG. 6, then the controller 330 may display December 20 and December 21, which are dates prior to the today's date, with a slant line region 851 differently from the dates subsequent to today's date.

If a specific media file 852 or canvas file 853 included in the prior dates is selected on the basis of the today's date, then the controller 330 may generate a message indicating a disable time cell of the expired date to display the generated message on a partial region of the display unit 340.

Figure 7:
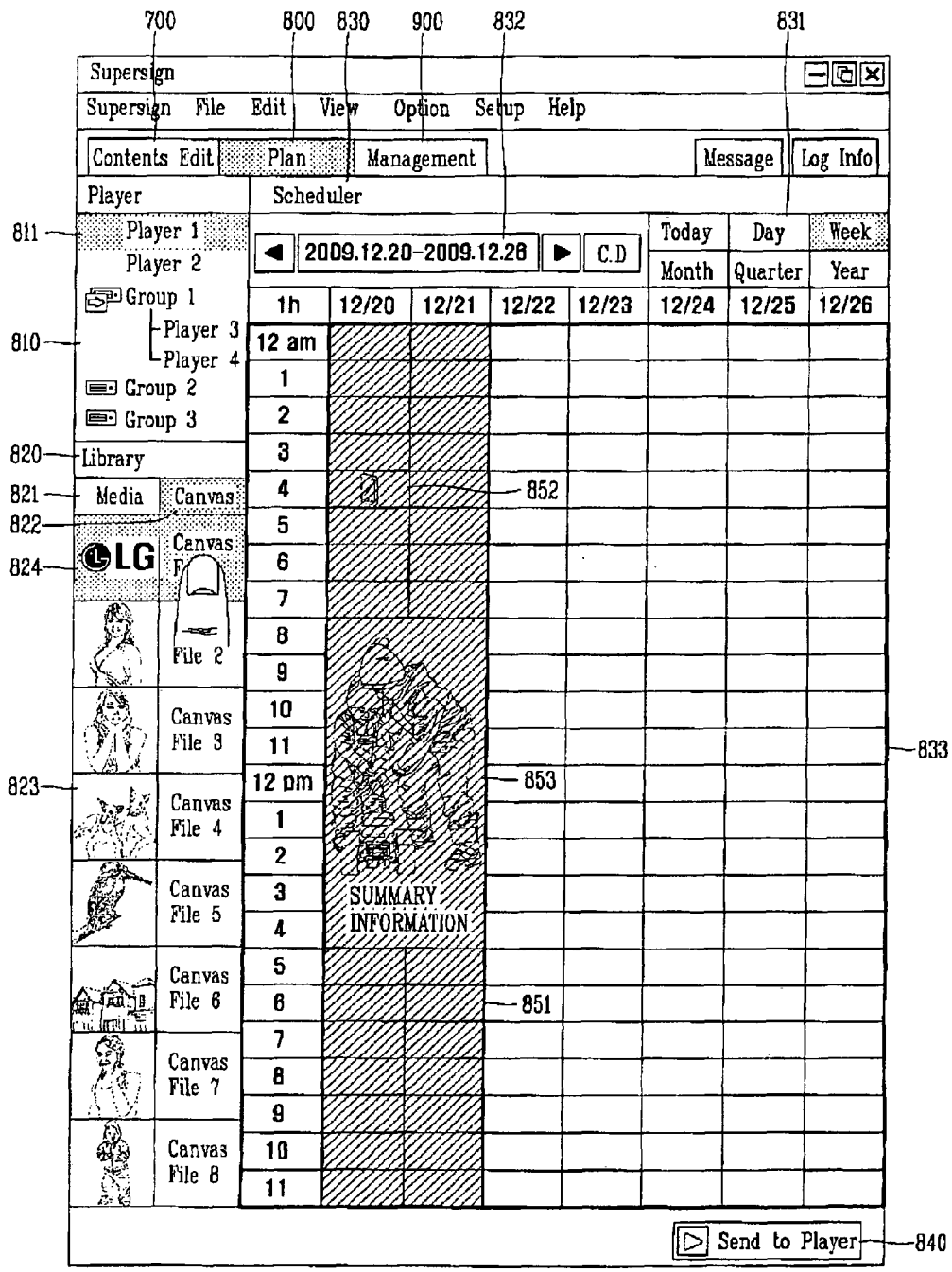

The display unit 340 (or the input unit 310) selects any one file (for example, "Canvas File 1") 824 selected by the user from canvas files included in the library 820 by the user's manipulation as illustrated in FIG. 7 (S110).

Figure 8:
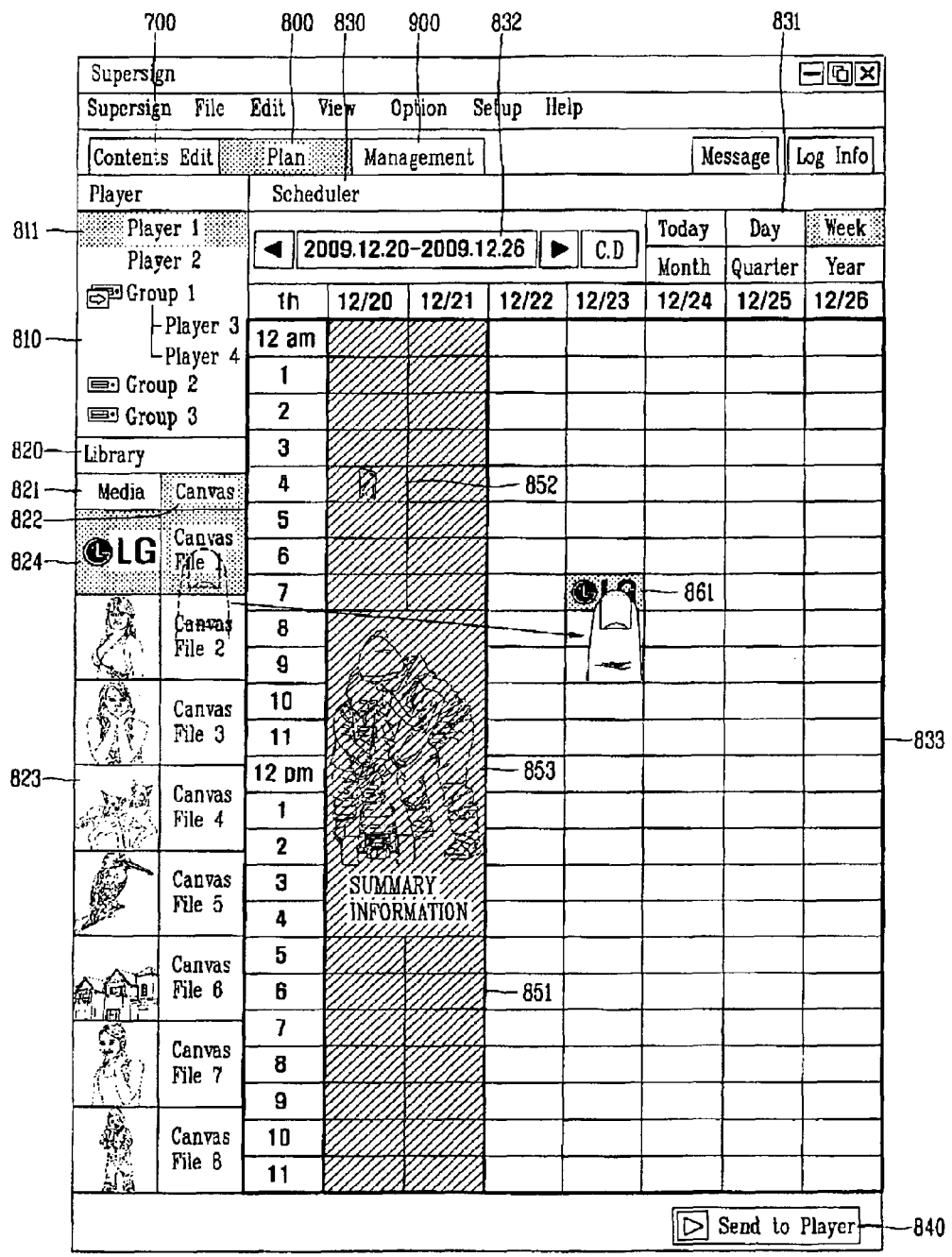

The controller 330 moves (or copies) the selected file to any (specific) location within a time cell in the library region displayed on the display unit 340 according to the user's request (through a drag-and-drop function). For example, in a state that any one file (for example, "Canvas File 1") 824 is selected from canvas files 822 included in the library region 820, the controller 330 moves the selected file to any (specific) location (for example, the location of "Dec. 23, 2009, 7 AM" (or Dec. 23, 2009, 7 AM-8 AM)) 861 within the time cell region using a drag-and-drop function as illustrated in FIG. 8. At this time, the file located (displayed) in the any (specific) time cell may be displayed with an image (thumbnail image) representing the content of the file, summary information (or characteristic information) for the file, or the like. Here, the summary information may include at least one of a file name, a title name, and a creation (or edition) date.

Figure 9:
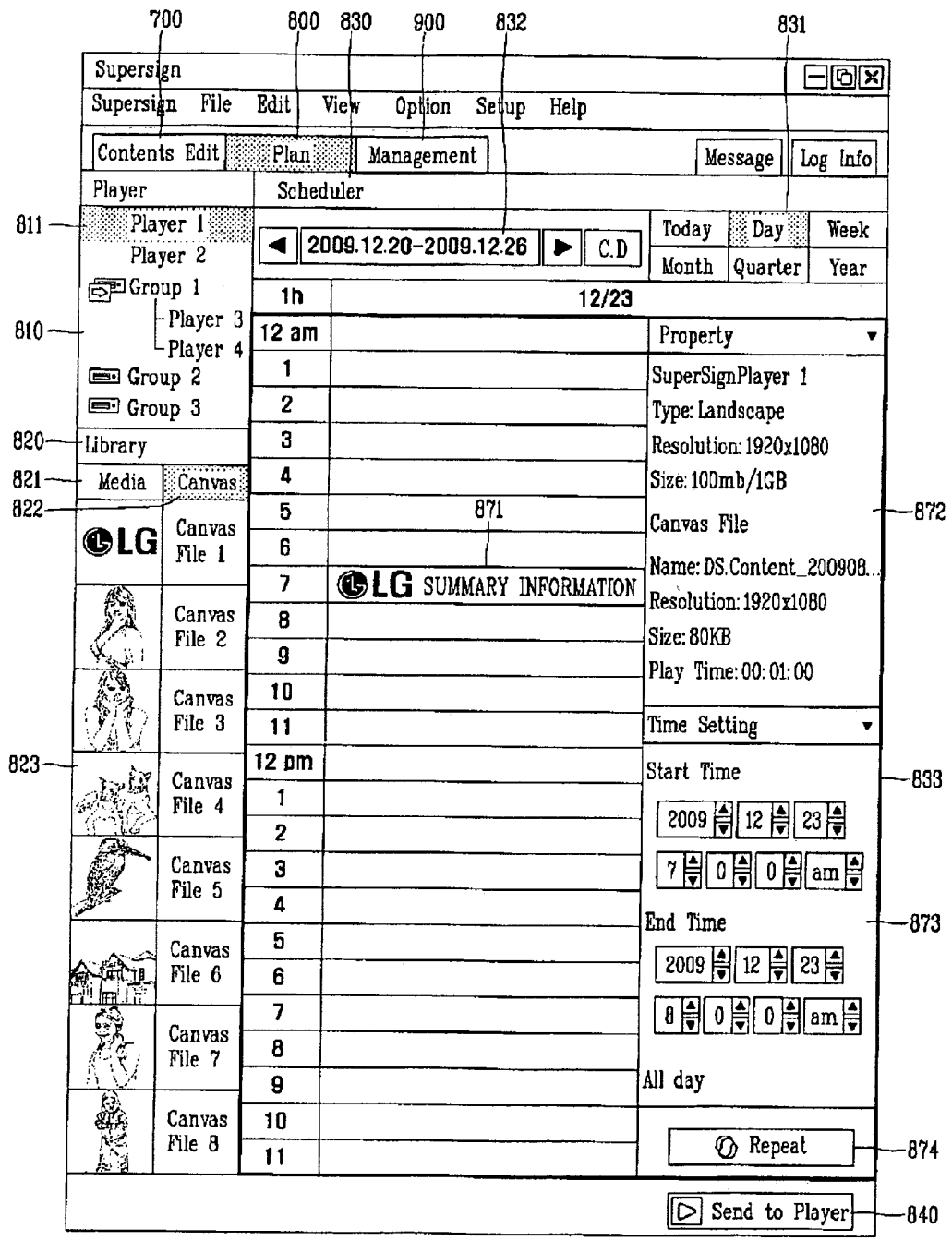

If a file located within the time cell region is selected (for example, selected by a double-click function), then the controller 330 may display a thumbnail and/or the summary information on the file on a partial region (for example, in a pop-up form) of the display unit 340. For example, if a file 861 located in the time cell region as illustrated in FIG. 8 is double-clicked, then the controller 330 may display a thumbnail 871 for the file and/or the summary information on a partial region of the display unit 340 as illustrated in FIG. 9. At this time, the controller 330 may additionally display summary information 872 for the file, time setup information 873 of the file, a preset button (for example, a repeat button) 874 for a repeat function of the time cell region where the file is located, and the like. Here, the summary information may include a player name, a type of the player, a resolution of the player, a size of the player, a kind of library, a file name, a resolution of the file, a size of the file, a play time, a title name, a creation date and the like (S120).

Figure 10:
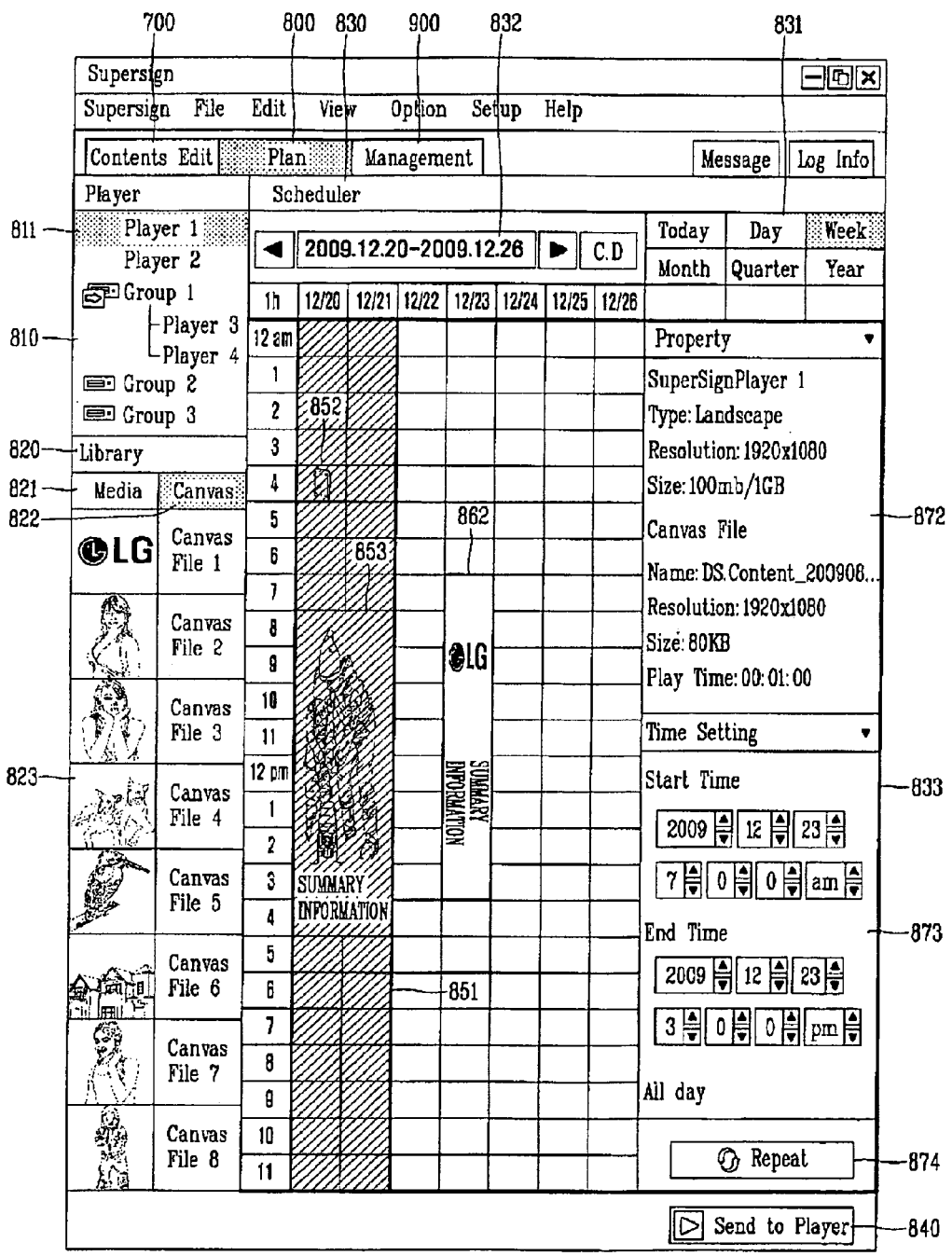

The controller 330 sets up a duration by adjusting the size of a time cell region where the file is located. For example, the controller 330 moves a lower edge among the edges of the time cell region 861 where the selected file 824 is located in a downward direction, thereby setting up (or changing) the duration of the selected file from previously "Dec. 23, 2009, 7 AM" to "Dec. 23, 2009, 7 AM-3 PM" 862 as illustrated in FIG. 10. Furthermore, the controller 330 may set up the duration by moving the upper/lower/left/right edge of the time cell region 861 where the selected file 824 is located (adjusting the size of a time cell region).

Figure 11:
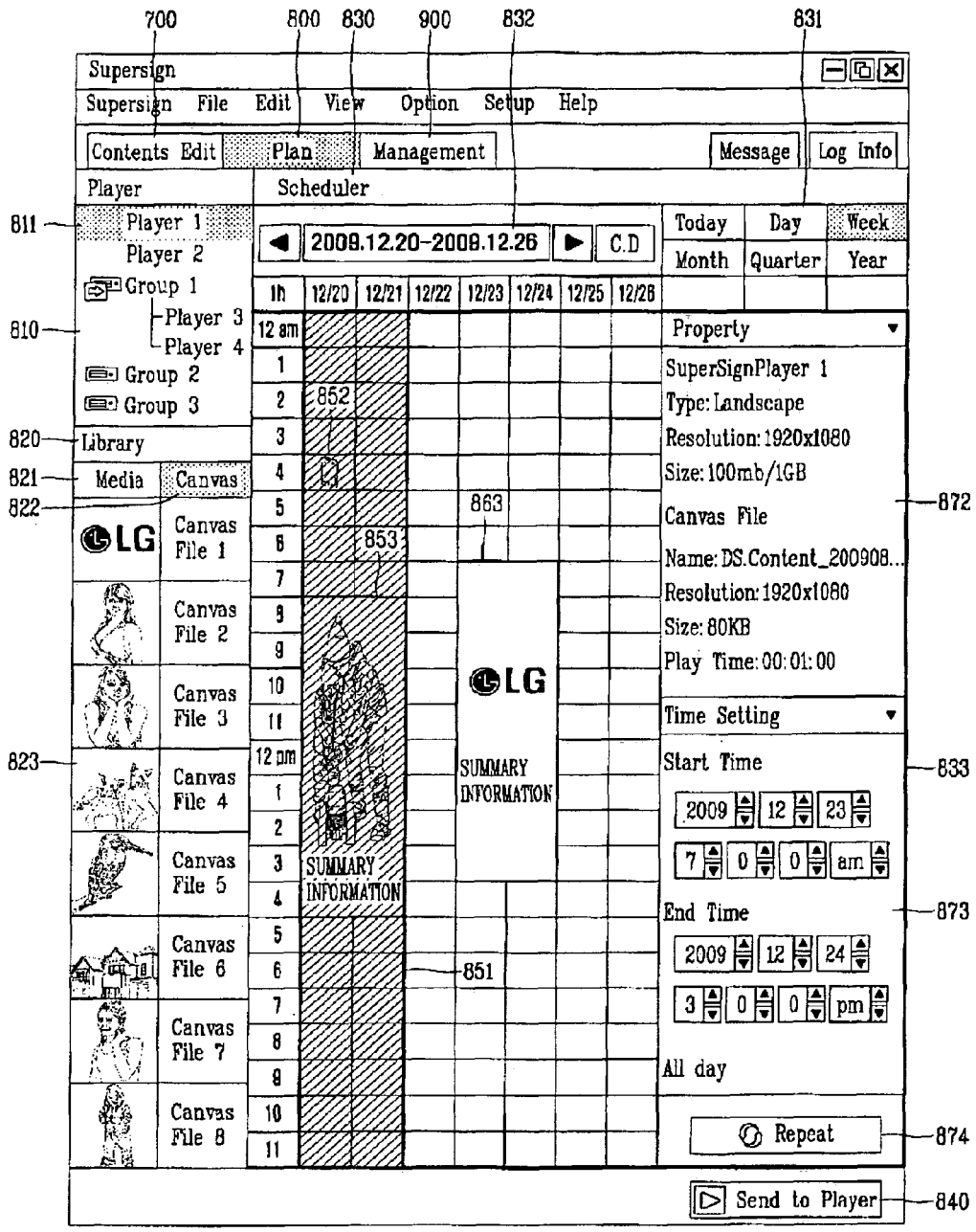

The controller 330 may set up a duration of the selected file by moving the selected file located in the time cell region in an up/down/left/right direction (adjusting the size of the selected file). For example, the controller 330 moves the selected file 824 located in the time cell region (for example, located at "Dec. 23, 2009, 7 AM") 861 in the down direction and right direction, thereby setting up the duration of the selected file from previously "Dec. 23, 2009, 7 AM" to "Dec. 23, 2009, 7 AM-2 PM" and "Dec. 24, 2009, 7 AM-2 PM" 863 as illustrated in FIG. 11 (S130).

Figure 12:
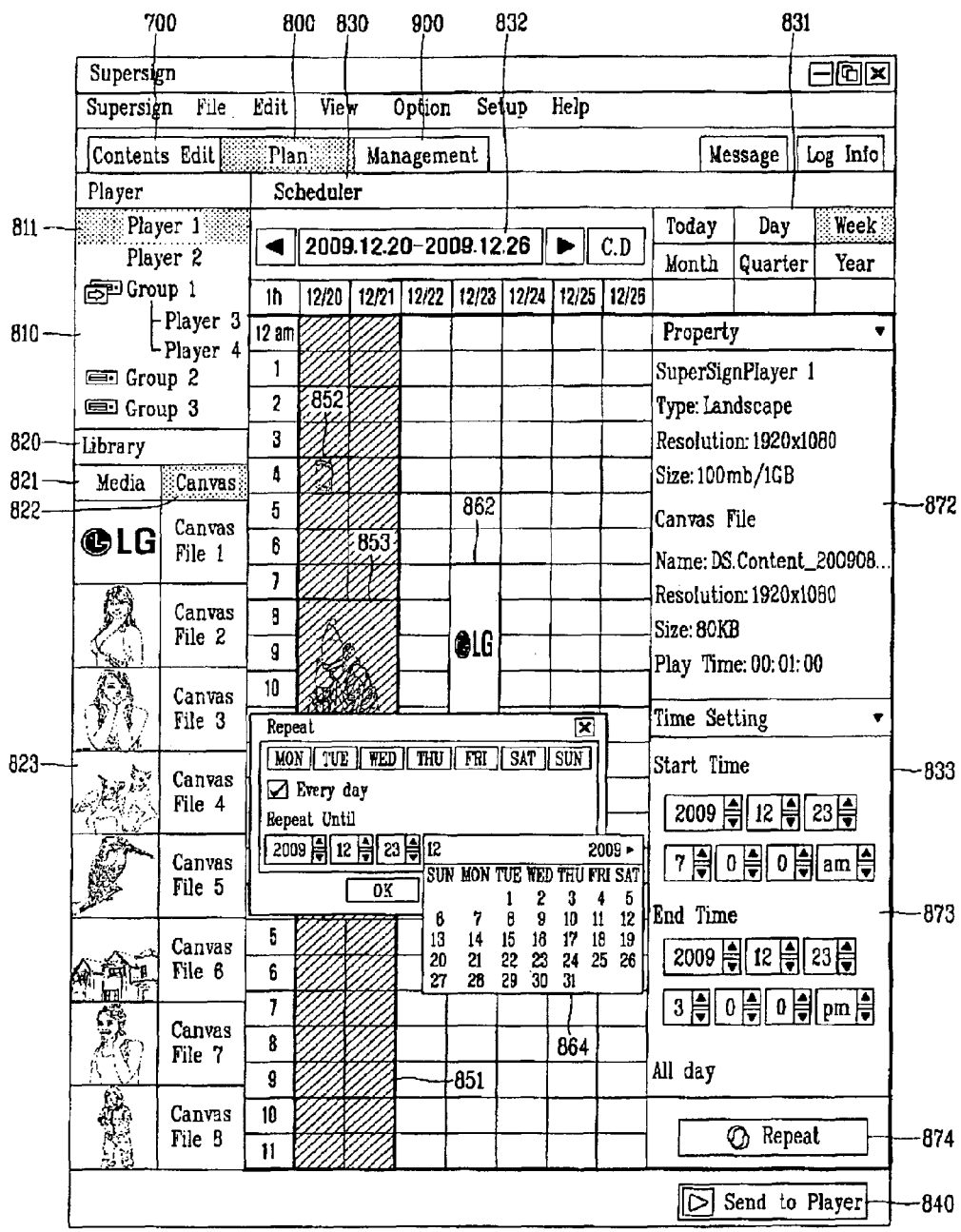
Figure 13:
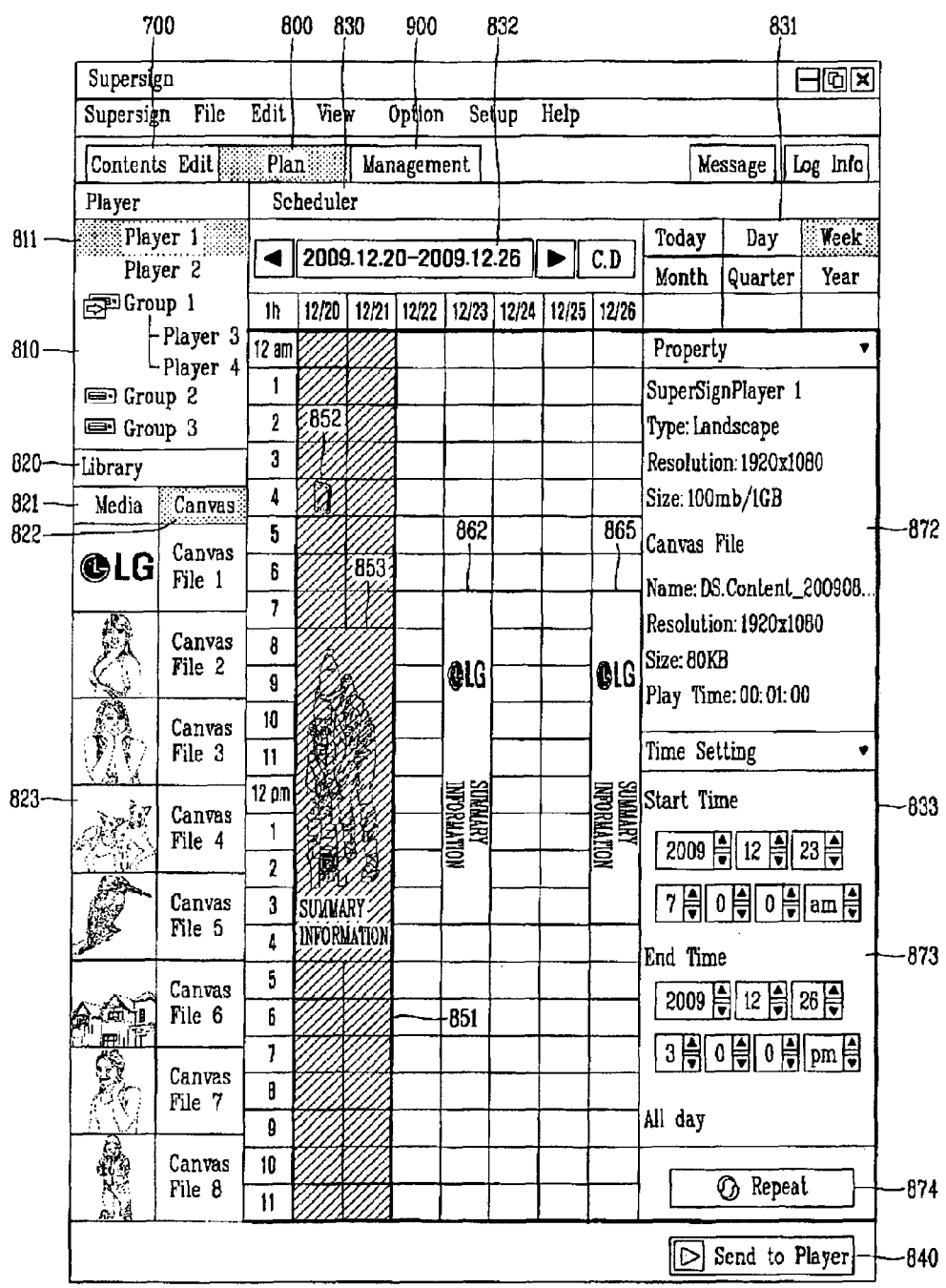

If a preset button is selected in a state that any file located in the time cell region is selected, then the controller 330 may perform a repeat function for the any file. For example, if a preset button 874 is selected in a state that a file 862 located in the time cell region 833 is selected, then the controller 330 displays date information (for example, calendar (C.D)) 864 in a pop-up form on a partial region of the display unit 340 as illustrated in FIG. 12. If at least one date information is selected, then the controller 330 copies the file at a predetermined time of the at least one selected date information to display on the display unit 340. In other words, if "Dec. 26, 2009" is selected from the date information as illustrated in FIG. 12, the controller 330 displays the file in the time cell region of "7 AM-3 PM" 865 which is the same time zone where the file is located among the time cell regions included in the selected "Dec. 26, 2009" as illustrated in FIG. 13. Here, the predetermined time may be the same time as a time (or time zone) at which the file is located in any location of the time cell region among a plurality of times included in the at least one selected date information respectively.

If the any file is copied to at least one date by a repeat function, then the controller 330 displays a preset repeat icon at a predetermined location of the any file displayed on the display unit 340, thereby distinguishing it from a typical time cell.

If the any file is copied at least one or more dates by a repeat function, then the controller 330 may select a single file or a plurality of files from the files included in the more or more dates respectively, and may delete the selected single file or plurality of files if a delete function for the selected file is performed.

The controller 330 may copy the content of all time cell regions included in any date including the disable time cell region to any date subsequent to a current date for a media file or canvas file located within the disable time cell region.

If the file is modified (including time zone modification, file content modification, etc.) when the any file is copied at least one or more dates by a repeat function, then the controller 330 may also reflect (or apply) the content of the any modified file to one or more files included in the at least one or more dates respectively.

Hereinafter, a method of controlling a digital signage apparatus (or data scheduling apparatus) allowing the user to intuitively and easily check and edit content information by displaying information on content (content file) including an icon indicating the repeat play of the content (content file), a representative image of the content (content file), an icon indicating the type of the content (content file), a title of the content (content file), a play time of the content (content file), and an extended play time of the content (content file) when a specific file (content or content file) is registered in a time cell region (time cell) 833 of the contents scheduler will be described with reference to FIG. 14.

Figure 14:
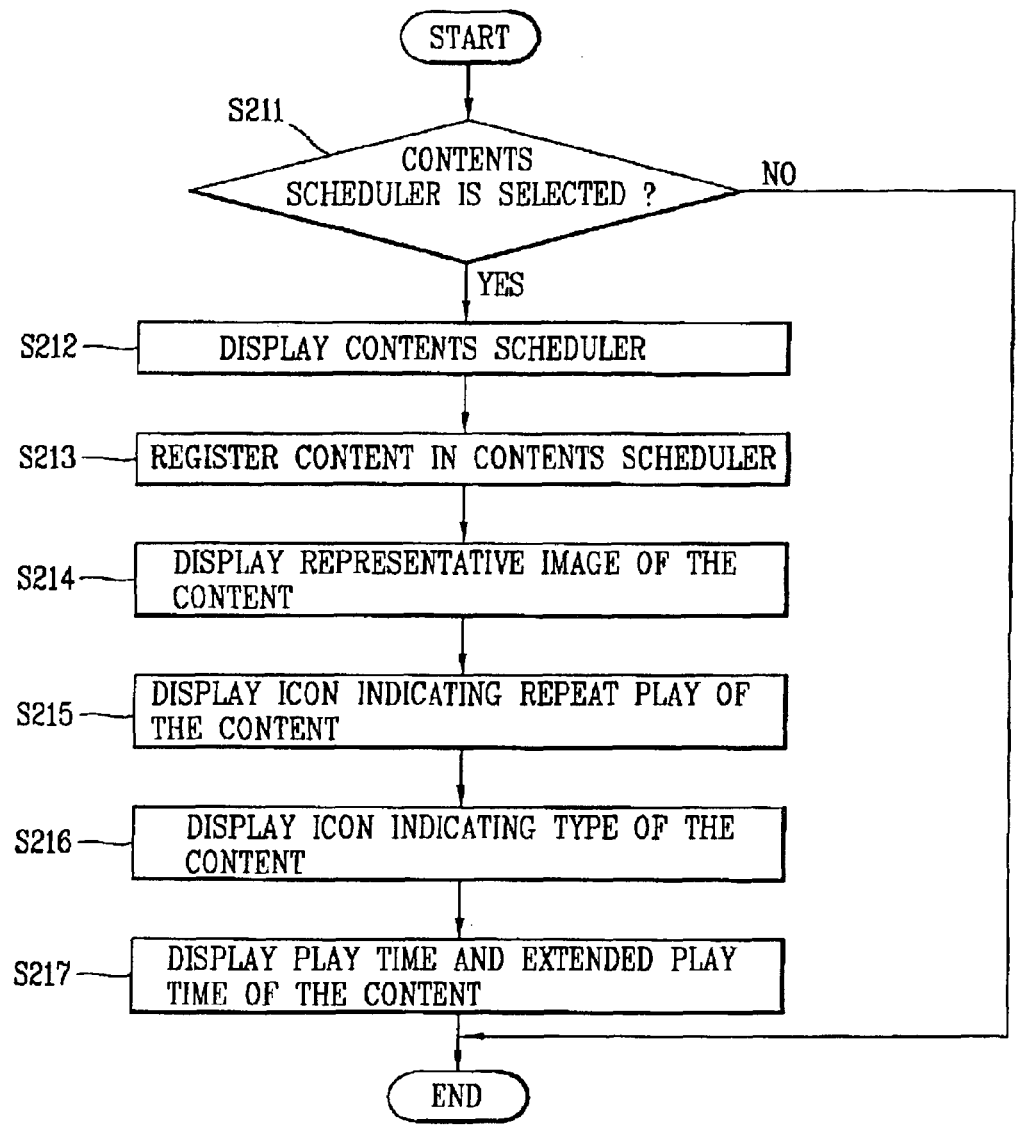
FIG. 14 is a flow chart illustrating a method of controlling a digital signage apparatus (or data scheduling apparatus) according to another embodiment of the present invention.

FIG. 14 is a flow chart illustrating a method of controlling a digital signage apparatus (or data scheduling apparatus) according to another embodiment of the present invention. Here, the digital signage apparatus and the method thereof according to another embodiment of the present invention may be also applicable to various terminals such as a navigation device, a smart phone, a notebook computer, a personal digital assistant (PDA), a portable multimedia player (PMP), a desktop computer as well as a mobile communication terminal 100, a telematics terminal 200, and an image conference terminal 300.

First, the controller 330 determines whether a plan menu (or contents scheduler) 800 for scheduling contents is selected by the user (S211), and displays the contents scheduler (scheduler window) on the display unit 340 when the contents scheduler is selected by the user (S212). Here, the controller 330 displays the contents scheduler (scheduler window) on the display unit 340 when the scheduler (for example, an icon indicating the scheduler) is touched by the user or the user selects the scheduler (for example, an icon indicating the scheduler) through a mouse.

When the user selects a specific content (data or content file) and drags-and-drops the selected content to the content time cell 833, the controller 330 registers summary information on the content in the contents scheduler (S213). The summary information (or content information) on the content may further include a video file, a picture file, a music file, a Word file, a PDF (Portable Document Format) file, an Excel file, a PowerPoint file, an Internet file, and a representative image (for example, thumbnail image, etc.) corresponding to a TV broadcast program.

Each file (content) corresponding to the representative image may be stored in the relevant folder of the contents scheduler. For example, if the user selects a specific video file from the relevant folder and then drags-and-drops the selected video file to the content time cell 833, then the controller 330 displays a thumbnail image (representative image, preview image) of the selected video in the content time cell 833 (S214).

If the user selects a specific still image file from the relevant folder and then drags-and-drops the selected still image file to the content time cell 833, then the controller 330 displays a thumbnail image of the selected still image in the content time cell 833. If the user selects a specific PowerPoint file from the relevant folder and then drags-and-drops the selected PowerPoint file to the content time cell 833, then the controller 330 displays a thumbnail image of the selected PowerPoint file in the content time cell 833.

When repeat play is selected for the selected content by the user, the controller 330 displays an icon indicating the repeat play of the content at an upper end of the representative image (S215). For example, the controller 330 may display an icon indicating the repeat play of the content adjacent to an icon for deleting content related information registered in the content time cell. The display location of an icon indicating the repeat play of the content is not necessarily fixed thereto but may be displayed at various locations according to the user's or designer's intention.

The controller 330 may display an icon indicating the type of the content at a lower end of the representative image while at the same time displaying an icon indicating the repeat play of the representative image and content in the content time cell 833 (S216).

The display location of an icon indicating the type of the content is not necessarily fixed thereto but may be displayed at various locations according to the user's or designer's intention.

The icon indicating the type of the content may be an icon indicating a video file, an icon indicating a picture, an icon indicating a music file, an icon indicating a Word file, an icon indicating a PDF (Portable Document Format) file, an icon indicating an Excel file, an icon indicating a PowerPoint file, and an icon indicating an Internet file. For example, if the type of the content selected by the user is a video file, then the controller 330 displays an icon indicating a video file at a lower end of the representative image. If the type of the content selected by the user is a music file, then the controller 330 displays an icon indicating a music file at a lower end of the representative image. If the type of the content selected by the user is a picture file, then the controller 330 displays an icon indicating a picture file at a lower end of the representative image.

If the type of the content selected by the user is a music file, then the controller 330 displays an icon indicating a music file at a lower end of the representative image. If the type of the content selected by the user is a Word file, then the controller 330 displays an icon indicating a Word file at a lower end of the representative image. If the type of the content selected by the user is a PDF file, then the controller 330 displays an icon indicating a PDF file at a lower end of the representative image.

If the type of the content selected by the user is an Excel file, then the controller 330 displays an icon indicating an Excel file at a lower end of the representative image. If the type of the content selected by the user is a PowerPoint file, then the controller 330 displays an icon indicating a PowerPoint file at a lower end of the representative image.

The controller 330 may further display the name (file name) of the content selected by the user in the content time cell 833. For example, assuming that the name of the content selected by the user is "Background Picture 1", the controller 330 may display the "Background Picture 1" at a lower end of the icon indicating the type of the content, and the display location of the name of the content selected by the user may be displayed at various locations according to the user's or designer's intention.

When a representative image corresponding to a specific content selected by the user is displayed, the controller 330 displays a play time of the content and an extended play time of the content together with the representative image (S217). In other words, when the play time (or display time) of the content selected by the user is from Dec. 22, 2009, 12 AM to Dec. 23, 2009, 6 AM, the controller 330 may display "12-22-2009 12:00 AM~12-23-2009 6:00 AM" at a lower end of the title of the content. For example, when a specific content selected by the user is a video file, the controller 330 displays "12-22-2009 12:00 AM~12-23-2009 6:00 AM" at a lower end of the title of the content if the play time of the video is from Dec. 22, 2009, 12 AM to Dec. 23, 2009, 6 AM, and then plays the video file only during the play time of the video file.

Furthermore, when the extended play time (or display time) of the content selected by the user is from Dec. 23, 2009, 6 AM to Dec. 23, 2009, 8 AM, the controller 330 may display "12-22-2009 6:00 AM~12-23-2009 8:00 AM" at a lower end of the play time of the content. For example, when a specific content selected by the user is a video file, the controller 330 displays "12-22-2009 6:00 AM~12-23-2009 8:00 AM" at a lower end of the title of the content if the extended play time of the video (for example, when video advertising time is extended by the client) is from Dec. 23, 2009, 6 AM to Dec. 23, 2009, 8 AM, and then plays the video file only during the extended play time of the video file. Here, the location of the play time and the extended play time of the content are not fixed thereto but may be displayed at various locations according to the user's or designer's intention.

Information on the content may include an icon indicating the repeat play of the content, a representative image of the content, an icon indicating the type of the content, a title of the content, a play time of the content, and an extended play time of the content.

As a result, in a digital signage apparatus (or data scheduling apparatus within a communication system) and a method thereof according to an embodiment of the present invention, when the user registers a specific content in a content time cell of the contents scheduler, information on the content including an icon indicating the repeat play of the content, a representative image of the content, an icon indicating the type of the content, a title of the content, a play time of the content, and an extended play time of the content are displayed in the content time cell, thereby allowing the user to intuitively and easily check and edit the content information.

Figure 15:
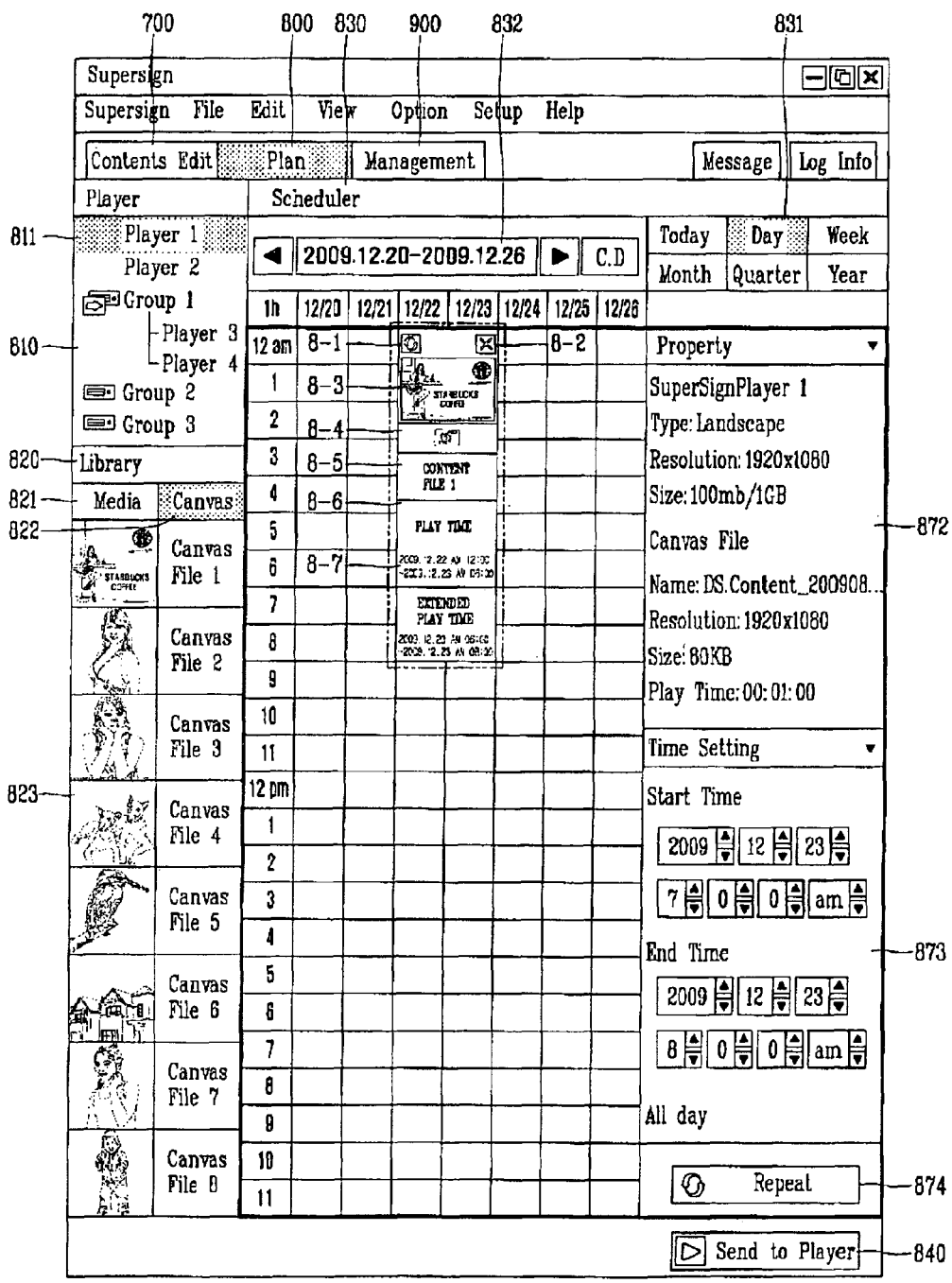
FIG. 15 is an exemplary view illustrating a scheduler displayed on the display unit according to another embodiment of the present invention.

FIG. 15 is an exemplary view illustrating a scheduler displayed on the display unit according to another embodiment of the present invention.

As illustrated in FIG. 15, when the user registers a specific content in a content time cell 833 of the contents scheduler, the controller 330 displays information on the content including an icon 8-2 for deleting content related information (or content information) registered in the content time cell, an icon 8-1 indicating the repeat play of the content, a representative image 8-3 of the content, an icon 8-4 indicating the type of the content, a title 8-5 of the content, a play time 8-6 of the content, and an extended play time 8-7 of the content in the content time cell 833, thereby allowing the user to intuitively and easily check and edit the content information.

Figure 16:
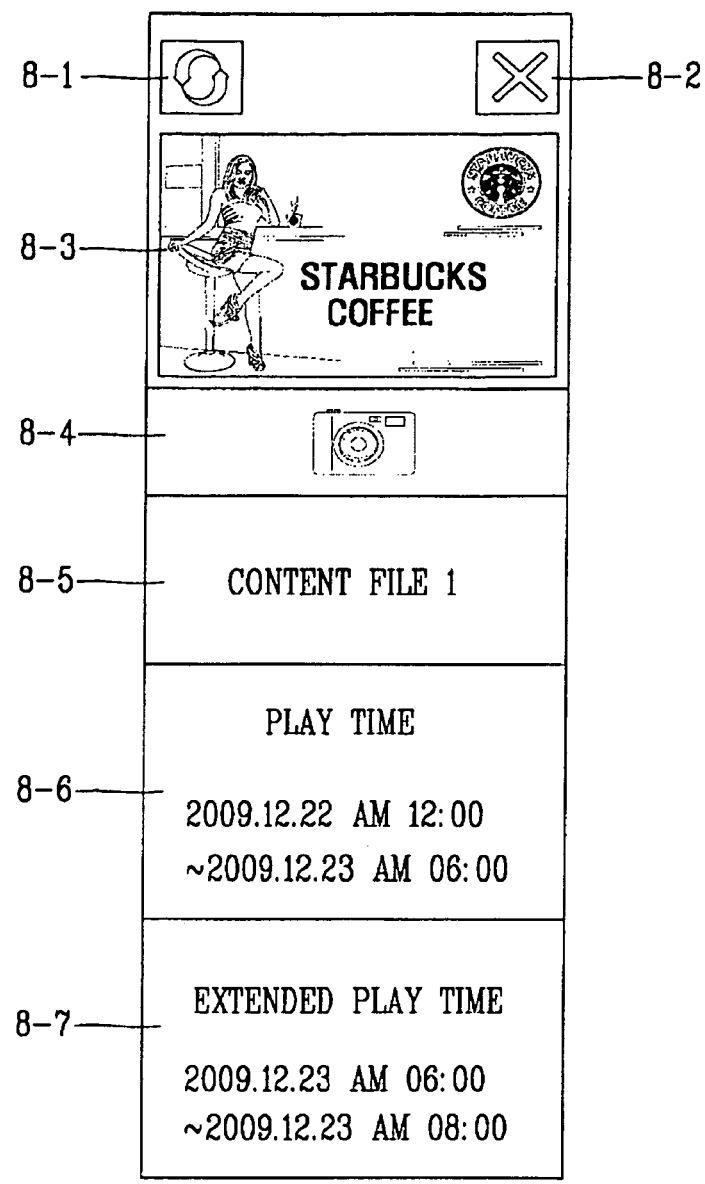
FIG. 16 is a view illustrating an enlarged view of content information displayed on a scheduler according to another embodiment of the present invention.

FIG. 16 is a view illustrating an enlarged view of content information displayed on a scheduler according to another embodiment of the present invention.

As illustrated in FIG. 9A, when the user registers a specific content in a content time cell 833 of the contents scheduler, the controller 330 displays information on the content including an icon 8-2 for deleting content related information (or content information) registered in the content time cell, an icon 8-1 indicating the repeat play of the content, a representative image 8-3 of the content, an icon 8-4 indicating the type of the content, a title 8-5 of the content, a play time 8-6 of the content, and an extended play time 8-7 of the content in the content time cell 833, thereby allowing the user to intuitively and easily check and edit the content information. Here, if the type of the content is a picture file, then the controller 330 displays an icon 8-4 indicating that it is a picture file at a lower end of the representative image.

Figure 17:
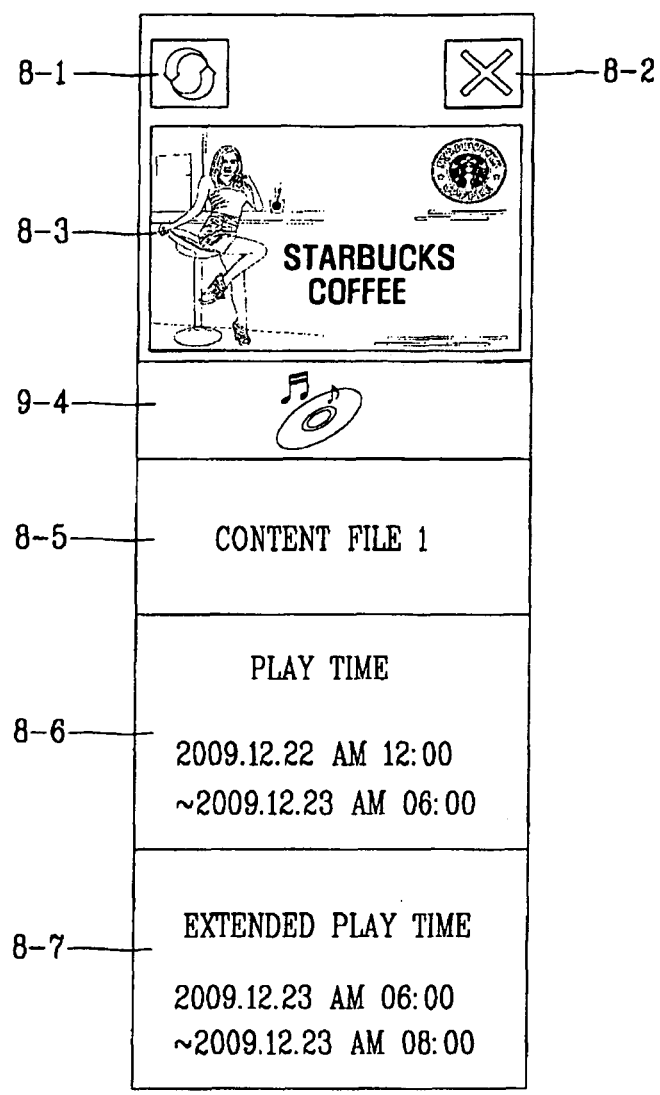
FIG. 17 is a view illustrating an enlarged view of another content information displayed on a scheduler according to another embodiment of the present invention.

FIG. 17 is a view illustrating an enlarged view of another content information displayed on a scheduler according to another embodiment of the present invention.

As illustrated in FIG. 17, when the user registers a specific content in a content time cell 833 of the contents scheduler, the controller 330 displays information on the content including an icon 8-2 for deleting content related information (or content information) registered in the content time cell, an icon 8-1 indicating the repeat play of the content, a representative image 8-3 of the content, an icon 9-4 indicating that the type of the content is a music file, a title 8-5 of the content, a play time 8-6 of the content, and an extended play time 8-7 of the content in the content time cell 833, thereby allowing the user to intuitively and easily check and edit the content information.

Figure 18:
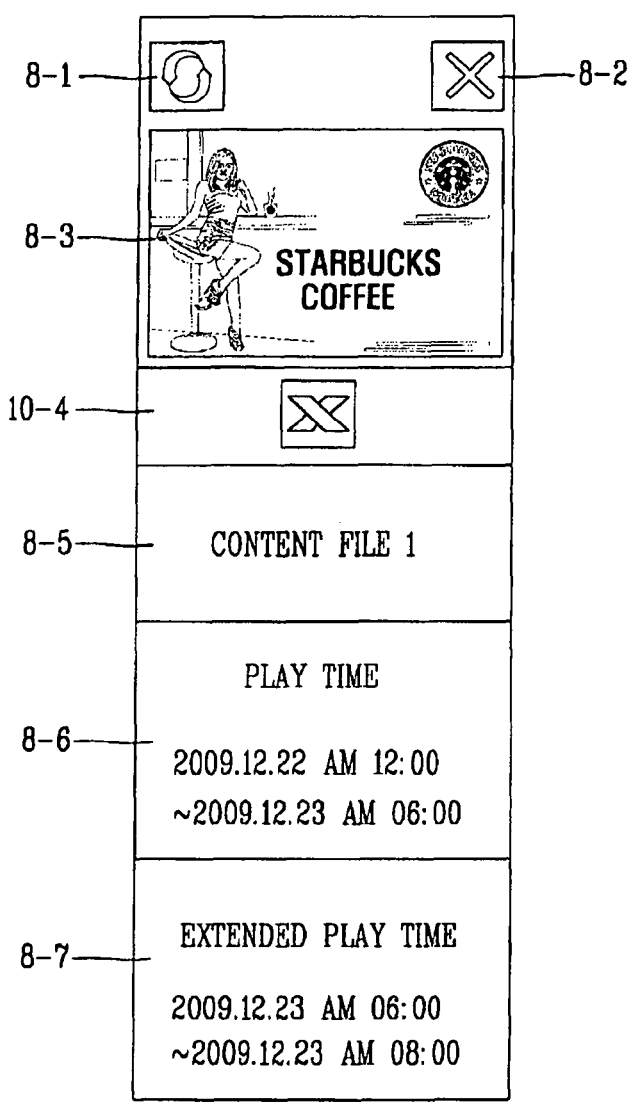
FIG. 18 is a view illustrating an enlarged view of still another content information displayed on a scheduler according to another embodiment of the present invention.

FIG. 18 is a view illustrating an enlarged view of still another content information displayed on a scheduler according to another embodiment of the present invention.

As illustrated in FIG. 18, when the user registers a specific content in a content time cell 833 of the contents scheduler, the controller 330 displays information on the content including an icon 8-2 for deleting content related information (or content information) registered in the content time cell, an icon 8-1 indicating the repeat play of the content, a representative image 8-3 of the content, an icon 10-4 indicating that the type of the content is an Excel file, a title 8-5 of the content, a play time 8-6 of the content, and an extended play time 8-7 of the content in the content time cell 833, thereby allowing the user to intuitively and easily check and edit the content information.

The controller 330 may display an icon indicating the type of file, such as an icon displaying a video file, an icon indicating a Word file, an icon indicating a PDF (Portable Document Format) file, an icon indicating a PowerPoint file, and an icon indicating an Internet file as well as an icon indicating a picture file, an icon indicating a music file, an icon indicating a Excel file.

Hereinafter, a method of controlling a digital signage apparatus (or data scheduling apparatus) capable of easily editing the registered content when a specific content is registered in a content time cell 833 of the content scheduler by the user will be described with reference to FIG. 19.

Figure 19:
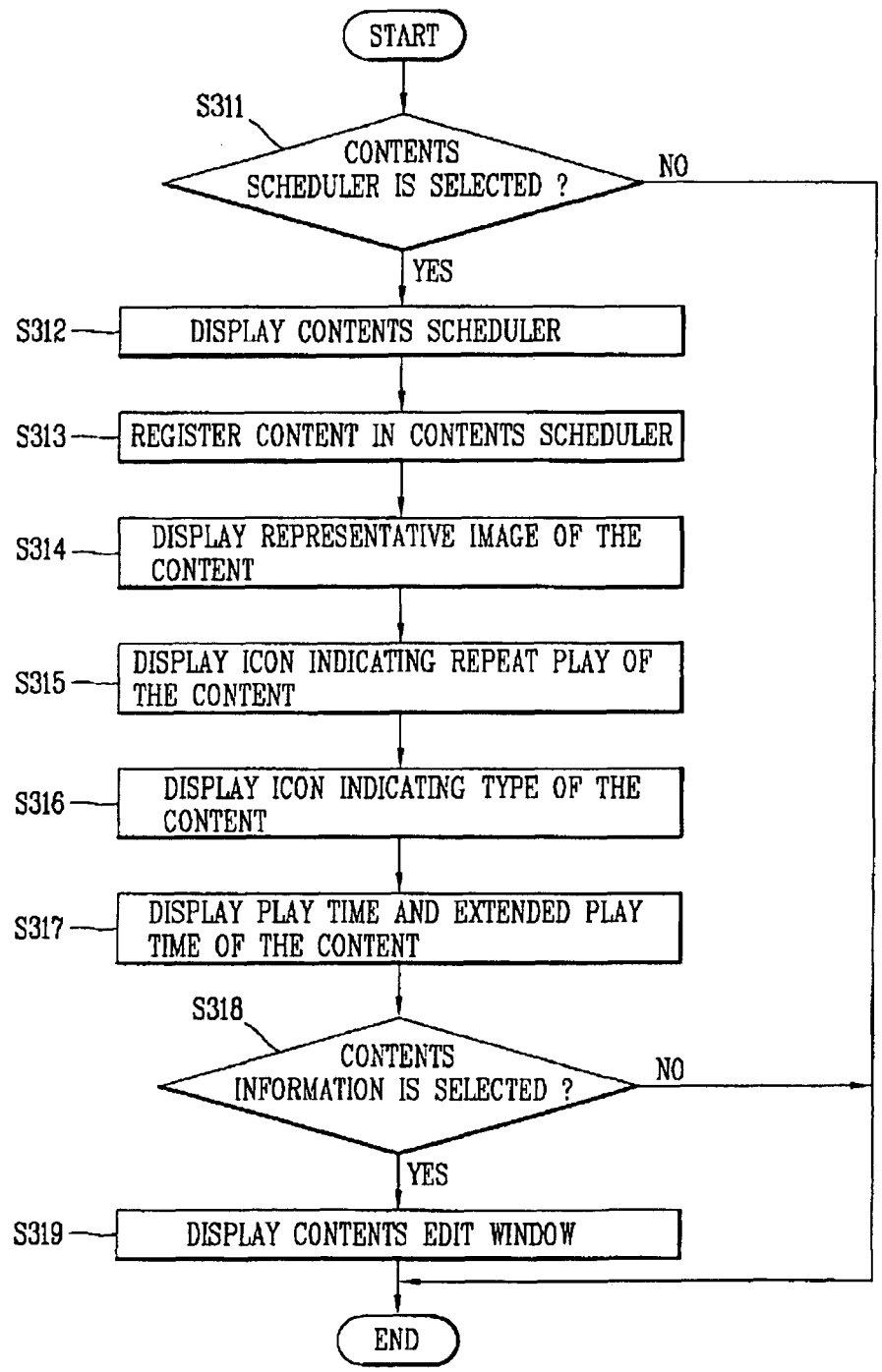
FIG. 19 is a flow chart illustrating a method of controlling a digital signage apparatus (or data scheduling apparatus) according to still another embodiment of the present invention.

FIG. 19 is a flow chart illustrating a method of controlling a digital signage apparatus (or data scheduling apparatus) according to still another embodiment of the present invention. Here, the digital signage apparatus and the method thereof according to still another embodiment of the present invention may be also applicable to various terminals such as a navigation device, a smart phone, a notebook computer, a personal digital assistant (PDA), a portable multimedia player (PMP), a desktop computer as well as a mobile communication terminal 100, a telematics terminal 200, and an image conference terminal 300.

First, the controller 330 determines whether a plan menu (or contents scheduler) 800 for scheduling contents is selected by the user (S311), and displays the contents scheduler on the display unit 340 when the contents scheduler is selected by the user (S312). Here, the controller 330 displays the contents scheduler on the display unit 340 when the scheduler is touched by the user or the user selects the scheduler through a mouse.

When the user selects a specific content (data) and drags-and-drops the selected content to the content time cell 833, the controller 330 registers summary information on the content in the contents scheduler (S313). The summary information (or content information) on the content may further include a video file, a picture file, a music file, a Word file, a PDF (Portable Document Format) file, an Excel file, a PowerPoint file, an Internet file, and a representative image (for example, thumbnail image, etc.) corresponding to a TV broadcast program.

Each file (content) corresponding to the representative image may be stored in the relevant folder of the contents scheduler. For example, if the user selects a specific video file from the relevant folder and then drags-and-drops the selected video file to the content time cell 833, then the controller 330 displays a thumbnail image (representative image, preview image) of the selected video in the content time cell 833 (S314).

If the user selects a specific still image file from the relevant folder and then drags-and-drops the selected still image file to the content time cell 833, then the controller 330 displays a thumbnail image of the selected still image in the content time cell 833. If the user selects a specific PowerPoint file from the relevant folder and then drags-and-drops the selected PowerPoint file to the content time cell 833, then the controller 330 displays a thumbnail image of the selected PowerPoint file in the content time cell 833.

When repeat play is selected for the selected content by the user, the controller 330 displays an icon indicating the repeat play of the content at an upper end of the representative image (S315). For example, the controller 330 may display an icon indicating the repeat play of the content adjacent to an icon for deleting content related information registered in the content time cell. The display location of an icon indicating the repeat play of the content is not necessarily fixed thereto but may be displayed at various locations according to the user's or designer's intention.

The controller 330 may display an icon indicating the type of the content at a lower end of the representative image while at the same time displaying an icon indicating the repeat play of the representative image and content on the content time cell 833 (S316). The display location of an icon indicating the type of the content is not necessarily fixed thereto but may be displayed at various locations according to the user's or designer's intention. The icon indicating the type of the content may be an icon indicating a video file, an icon indicating a picture, an icon indicating a music file, an icon indicating a Word file, an icon indicating a PDF (Portable Document Format) file, an icon indicating an Excel file, an icon indicating a PowerPoint file, and an icon indicating an Internet file. For example, if the type of the content selected by the user is a video file, then the controller 330 displays an icon indicating a video file at a lower end of the representative image. If the type of the content selected by the user is a music file, then the controller 330 displays an icon indicating a music file at a lower end of the representative image. If the type of the content selected by the user is a picture file, then the controller 330 displays an icon indicating a picture file at a lower end of the representative image. If the type of the content selected by the user is a music file, then the controller 330 displays an icon indicating a music file at a lower end of the representative image. If the type of the content selected by the user is a Word file, then the controller 330 displays an icon indicating a Word file at a lower end of the representative image. If the type of the content selected by the user is a PDF file, then the controller 330 displays an icon indicating a PDF file at a lower end of the representative image. If the type of the content selected by the user is an Excel file, then the controller 330 displays an icon indicating an Excel file at a lower end of the representative image. If the type of the content selected by the user is a PowerPoint file, then the controller 330 displays an icon indicating a PowerPoint file at a lower end of the representative image.

The controller 330 may further display the name (file name) of the content selected by the user on the content time cell 833. For example, assuming that the name of the content selected by the user is "Background Picture 1", the controller 330 may the "Background Picture 1" at a lower end of the icon indicating the type of the content, and the display location of the name of the content selected by the user may be displayed at various locations according to the user's or designer's intention.

When a representative image corresponding to a specific content selected by the user is displayed, the controller 330 displays a play time of the content and an extended play time of the content together with the representative image (S317). In other words, when the play time (or display time) of the content selected by the user is from Dec. 22, 2009, 12 AM to Dec. 23, 2009, 6 AM, the controller 330 may display "12-22-2009 12:00 AM~12-23-2009 6:00 AM" at a lower end of the title of the content. For example, when a specific content selected by the user is a video file, the controller 330 displays "12-22-2009 12:00 AM~12-23-2009 6:00 AM" at a lower end of the title of the content if the play time of the video is from Dec. 22, 2009, 12 AM to Dec. 23, 2009, 6 AM, and then plays the video file only during the play time of the video file.

Furthermore, when the extended play time (or display time) of the content selected by the user is from Dec. 23, 2009, 6 AM to Dec. 23, 2009, 8 AM, the controller 330 may display "12-22-2009 6:00 AM~12-23-2009 8:00 AM" at a lower end of the play time of the content. For example, when a specific content selected by the user is a video file, the controller 330 displays "12-22-2009 6:00 AM~12-23-2009 8:00 AM" at a lower end of the title of the content if the extended play time of the video (for example, when video advertising time is extended by the client) is from Dec. 23, 2009, 6 AM to Dec. 23, 2009, 8 AM, and then plays the video file only during the extended play time of the video file. Here, the location of the play time and the extended play time of the content are not fixed thereto but may be displayed at various locations according to the user's or designer's intention.

When a representative image (content information) corresponding to a specific content selected by the user is displayed in the content time cell 833, the controller 330 determines whether the representative image (content information) is selected by the user (S318). For example, when a representative image (content information) corresponding to a specific content selected by the user is displayed in the content time cell 833, the controller 330 determines whether the representative image (content information) is touched or double-clicked by the user.

If the representative image (content information) is touched or double-clicked by the user when the representative image (content information) corresponding to the specific content selected by the user is displayed in the content time cell 833, the controller 330 displays an edit window for editing the content and the content information on the display unit 340.

Figure 20:
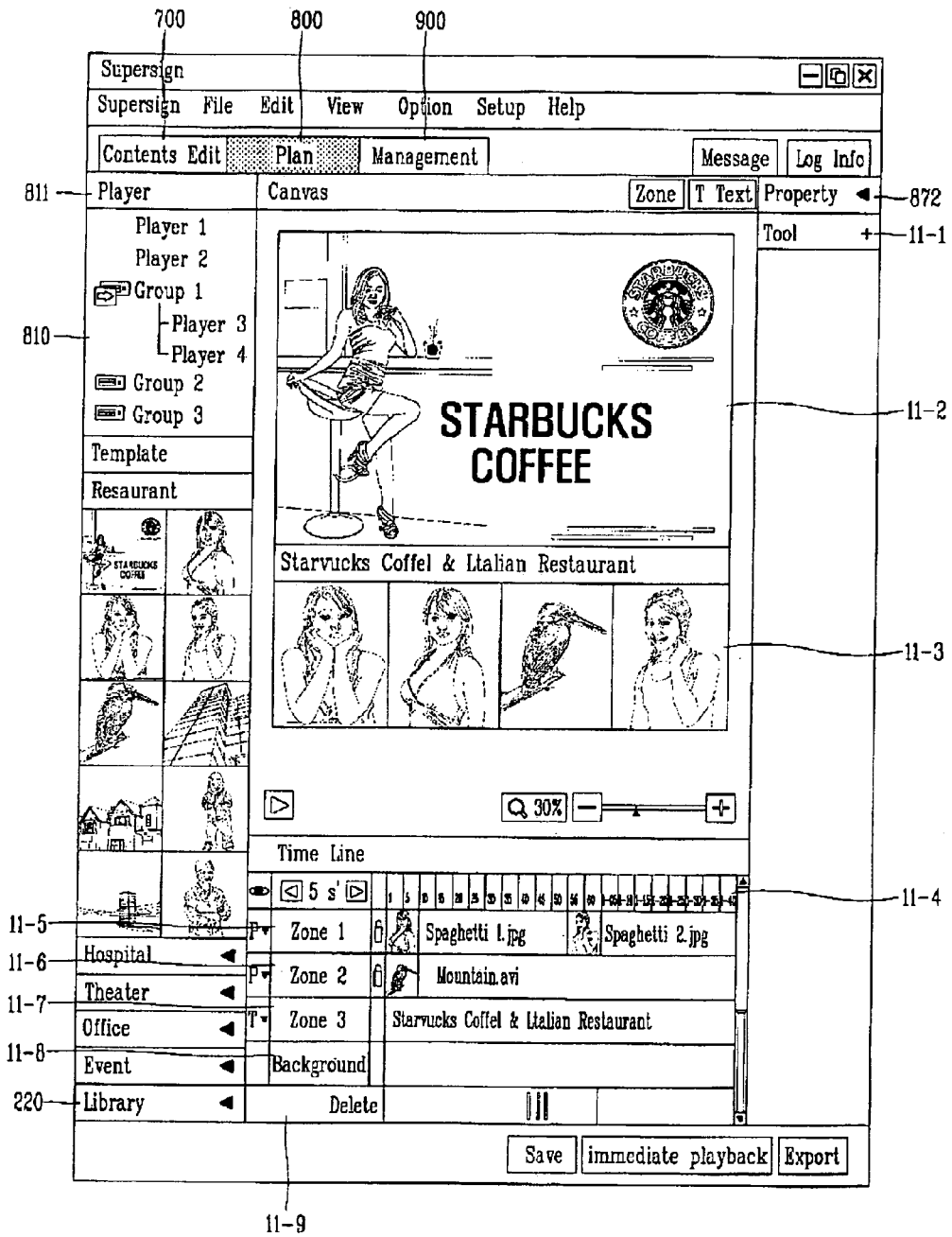
FIG. 20 is a view illustrating an edit window of a scheduler according to still another embodiment of the present invention.

FIG. 20 is a view illustrating an edit window of a scheduler according to still another embodiment of the present invention.

As illustrated in FIG. 20, if a representative image (content information) is touched or double-clicked by the user when the representative image (content information) corresponding to a specific content selected by the user is displayed in the content time cell 833, then the controller 330 displays an edit window for editing the content on the display unit 340. Here, a content displayed on an edit window for editing the content denotes a content displayed on a real player (for example, a first display device 500).

The edit window for editing the content may include a tool region 11-1 having various edit functions such as adjusting a size of the content (for example, image), modifying a text within the content, rotating the content, and setting a color of the content; a time line 11-4 for setting a play time (or display time) of the content; a first zone (or first region) 11-5 for displaying a picture (still image) 11-3 related to the content; a second zone 11-6 for displaying a video 11-2 related to the content; a third zone 11-7 for indicating information (for example, company name, restaurant name, food name, product name, etc.) related to the content; a background region 11-8 for indicating a background (for example, background color, background picture) of the content; and a deletion region 11-9 for deleting the content.

As a result, in a digital signage apparatus and a method thereof according to still another embodiment of the present invention, a content edit window is displayed on the display unit 340 when the user selects content information registered in a content time cell of the content scheduler, thereby allowing the user to easily and quickly edit the relevant content.

Hereinafter, a method of controlling a digital signage apparatus according to still another embodiment of the present invention will be described with reference to FIGS. 4 through 21.

Figure 21:
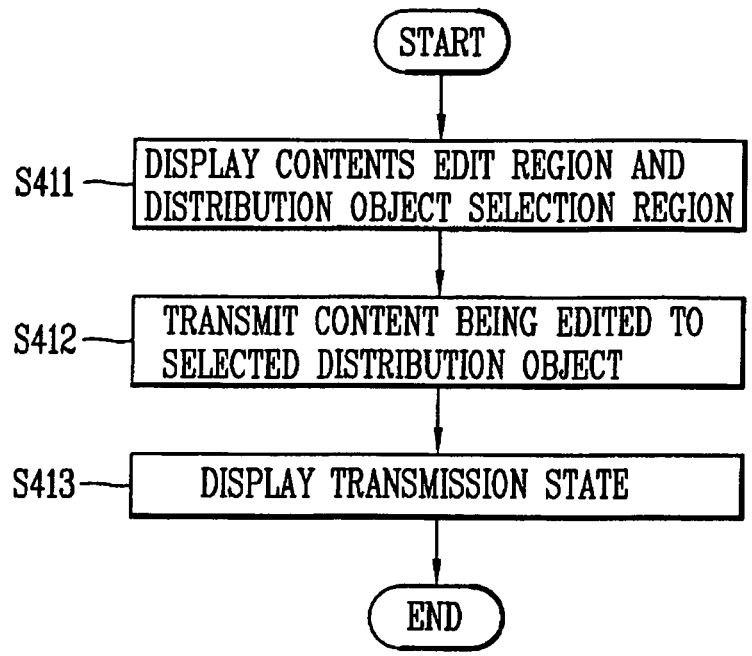
FIG. 21 is a flow chart illustrating a method of controlling a digital signage apparatus according to still another embodiment of the present invention.

FIG. 21 is a flow chart illustrating a method of controlling a digital signage apparatus according to still another embodiment of the present invention.

First, when in the edit mode of a content (file or content file), the display unit 340 displays it by dividing an edit region of the content and a distribution object selection region of the content (S411). It will be described with reference to FIG. 13.

Figure 22:
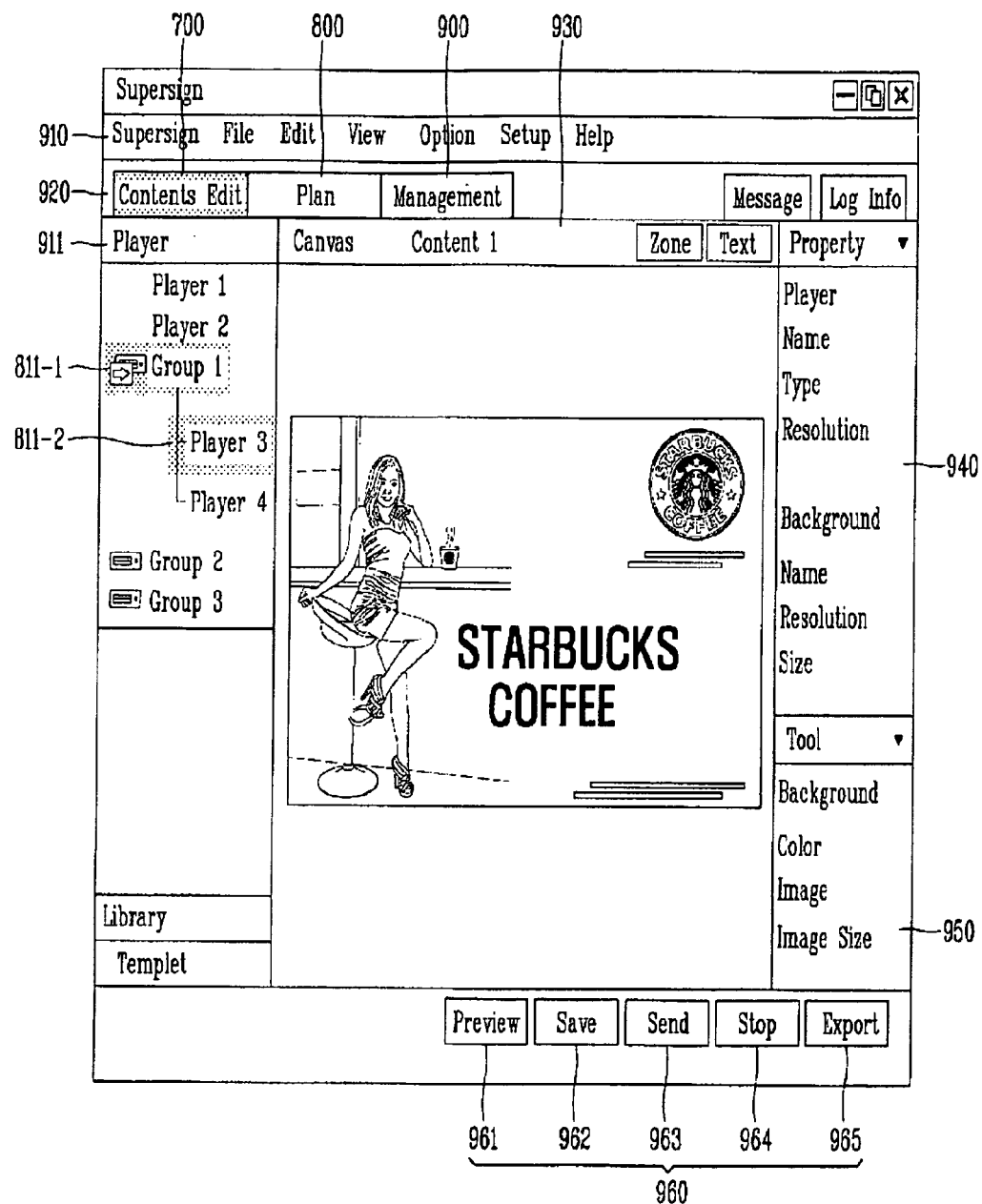
FIG. 22 is an exemplary view illustrating a scheduler (graphic user interface) when a digital signage apparatus according to still another embodiment of the present invention is in an edit mode.

FIG. 22 is an exemplary view illustrating a scheduler (graphic user interface) when a digital signage apparatus 300 according to still another embodiment of the present invention is in an edit mode.

As illustrated in FIG. 22, a scheduler (graphic user interface) of the digital signage apparatus 300 provides a basic menu 910 for file management, contents edit, screen view, program options and setup regardless of the mode.

Furthermore, a scheduler (graphic user interface) of the digital signage apparatus 300 provides a mode selection menu 920. The mode selection menu 920 provides a contents edit menu 700 for editing contents, a plan menu 800 for setting up scheduling using the contents, and a management menu 900 for managing a distribution object of the contents and monitoring an output state thereof.

On the other hand, a scheduler when the digital signage apparatus 300 is in an edit mode may include a player region (distribution object selection region 911) for displaying information on a distribution object such as the display device 500, display device group, and the like, a content region (content edit region 930) for displaying a content being edited, an attribute region 940 for providing attribute information on a player and a background, a tool region 950 for providing the setup for a background and an image, and a quick menu 960 for providing main functions related to the distribution of the content in the form of buttons 961 through 965.

The input unit 310 selects a distribution object for distributing contents among one or more distribution objects displayed in a distribution object selection region of the content according to the user's request. For example, when in an edit mode, a display device group (for example, 811-1) and/or a display device (player 3) (for example, 811-2) for distributing a content may be selected as a distribution object of the content being edited among one or more distribution objects or display devices 500 displayed on the distribution object selection region 911.

If a preset input is received through the input unit 310, then the controller 330 transmits a content being edited to a distribution object selected through the communication unit 360 (S412). The preset input may be an input based on the click signal of a specific button displayed on the display unit 340.

If a send button 963 included in the quick menu 960 is clicked, then the content being edited may be transmitted to the selected distribution object. The display unit 340 may display a transmission state of the transmitted content (S413). It will be described with reference to FIG. 14.

Figure 23:
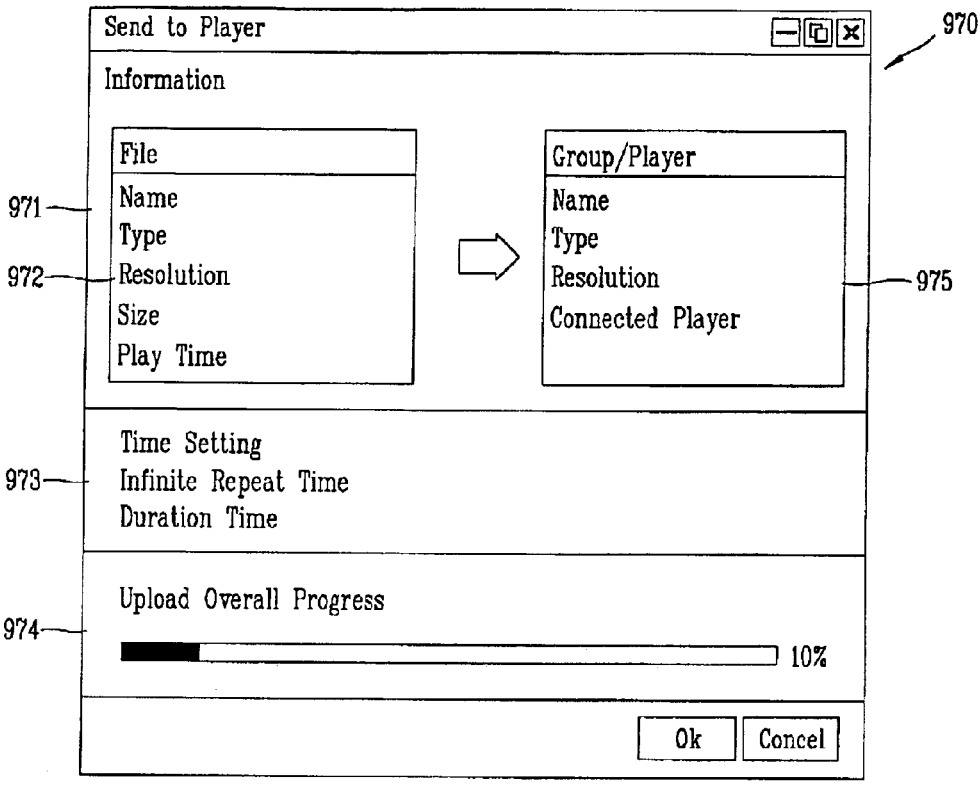
FIG. 23 is an exemplary view illustrating a scheduler (user interface) displaying information on a content transmission state of a digital signage apparatus according to still another embodiment of the present invention is in an edit mode.

FIG. 23 is an exemplary view illustrating a scheduler (user interface) displaying information on a content transmission state of a digital signage apparatus 300 according to still another embodiment of the present invention is in an edit mode.

As illustrated in FIG. 23, information 970 for the transmission state may include at least one of a content and distribution object information region 971 indicating a content and information on a distribution object, an output information region 973 indicating information on output, and a transmission status information region 974 indicating a transmission status. The content and distribution object information region 971 may include a content information region 972 and a distribution object information region 975. The content information region 972 may include at least one of a title, a type, a resolution, a file size, and a play time of the content. The distribution object information region 975 may include a title, a type, a resolution of the distribution object, and information on a display device 500 or display device group included in the distribution object. The output information region 973 may include a repeat or single play or a play duration. In the transmission status information region 974, the transmission status of the content is displayed in the form of a graph and a numeral based on the percent unit. On the other hand, a scheduler (user interface) indicating the transmission state of the content may be displayed in the form of a pop-up window.

Figure 24:
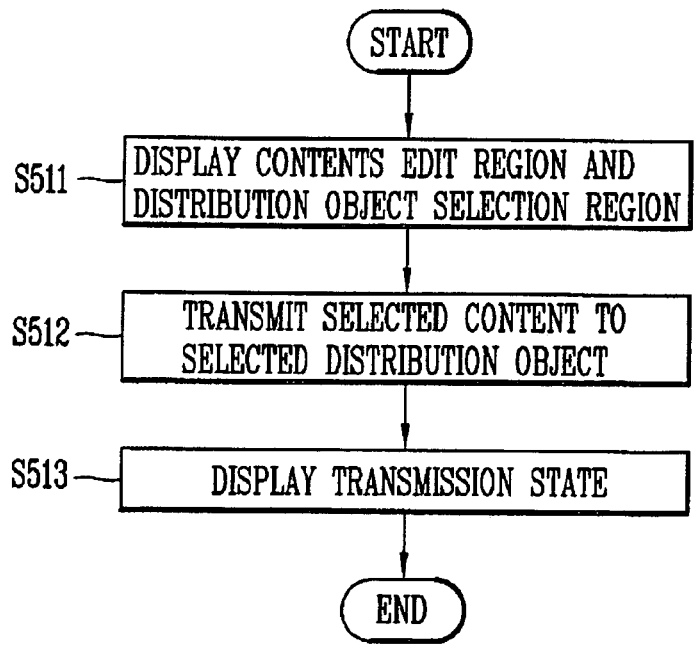
FIG. 24 is a flow chart illustrating a method of controlling a digital signage apparatus 300 according to still another embodiment of the present invention.

FIG. 24 is a flow chart illustrating a method of controlling a digital signage apparatus 300 according to still another embodiment of the present invention.

First, when in the management mode of a content and a distribution object, the display unit 340 displays it by dividing a selection region of the content and a distribution object selection region of the content (S511). The display unit 340 may display it by including information on a layout direction (horizontal or vertical) or whether to supply power (power on or off) for each distribution object of the content in the distribution object selection region of the content.

Furthermore, the display unit 340 may display it by further including information on whether an error has been occurred for each distribution object of the content in the distribution object selection region of the content.

If a mouse over event is received at a position where each distribution object of the content is displayed through the input unit 310, then the controller 330 may display at least one of a title, network information, an output type, a memory size of the distribution object in which the mouse over event has been generated and a title of the content being outputted through the display unit 340.

Figure 25:
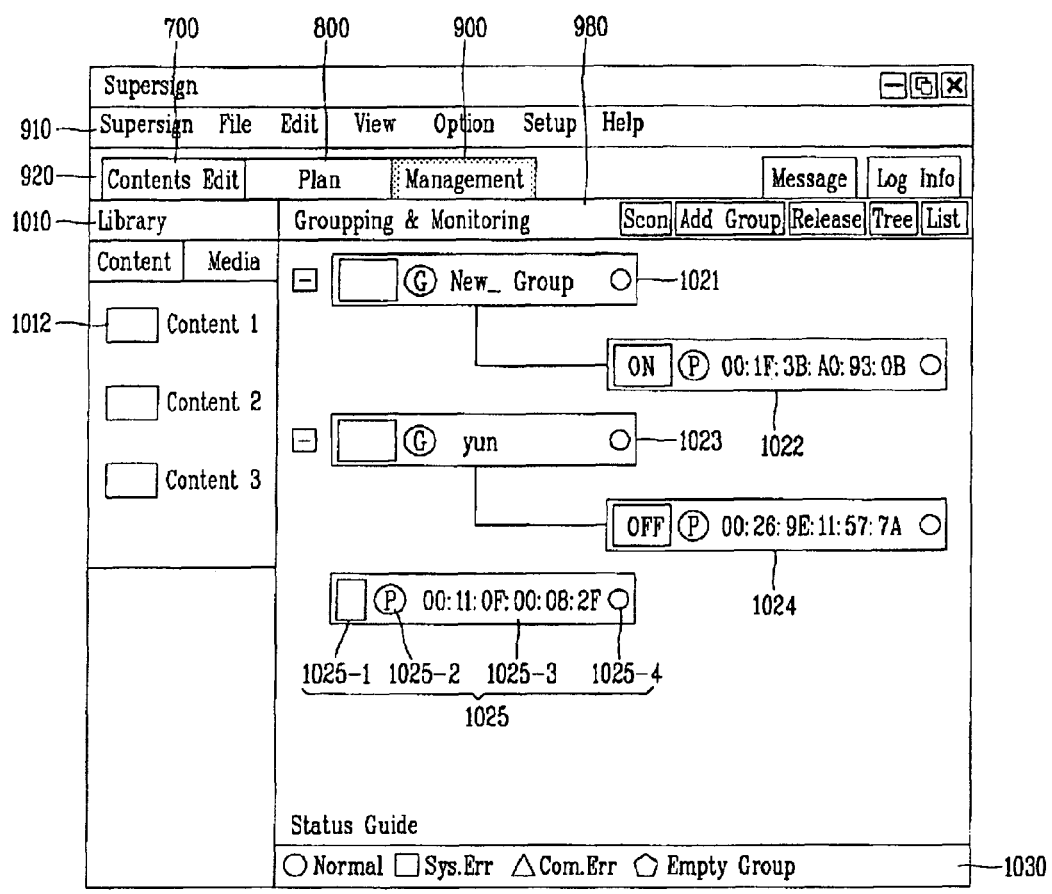
FIG. 25 is an exemplary view illustrating a scheduler (user interface) when a digital signage apparatus according to still another embodiment of the present invention is in a manager mode.

FIG. 25 is an exemplary view illustrating a scheduler (user interface) when a digital signage apparatus 300 according to still another embodiment of the present invention is in a manager mode.

As illustrated in FIG. 25, a scheduler (user interface) when a digital signage apparatus is in the management mode may further include a library region (contents selection region 1010) for providing a list of contents that can be distributed, a grouping and monitoring region (distribution object selection region 980) for managing a distribution object of the content and an output state thereof, and a state guide region 1030 for providing a guide for the state display of the distribution object in addition to the basic menu 910 and the mode selection menu 920.

Furthermore, for a distribution object (for example, 1025) displayed in the distribution object selection region 980, it may be displayed together with summary information on the distribution object including at least one of a layout direction (horizontal or vertical) 1025-1 of the distribution object, a display 1025-2 of a display device group or display device 500, an identification information 1025-3 of the distribution object, and information 1025-4 as to whether an error has been occurred in the distribution object.

On the other hand, the information 1025-4 as to whether an error has been occurred may include a display indicating that the display device 500 is normally being operated, a display indicating that a system error has been occurred, a display indicating that a communication error between the digital signage apparatus 300 and the display device 500 has been occurred, and the like. In addition, if the distribution object is a display device group, then it may be possible to make a display indicating that any display device 500 is not included in the display device group.

Figure 26:
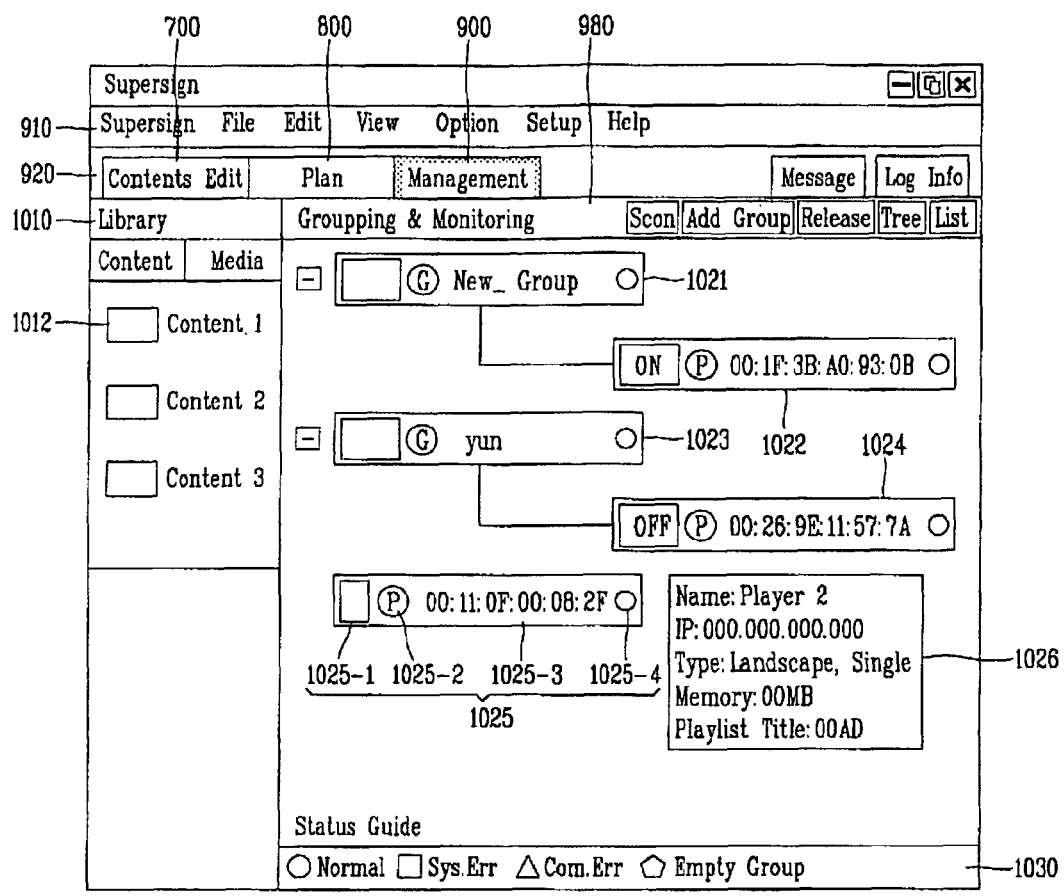
FIG. 26 is an exemplary view illustrating a scheduler (user interface) displaying detailed information on distribution objects when a digital signage apparatus according to still another embodiment of the present invention is in a manager mode.

FIG. 26 is an exemplary view illustrating a scheduler (user interface) displaying detailed information on distribution objects when a digital signage apparatus 300 according to still another embodiment of the present invention is in a manager mode.

As illustrated in FIG. 26, when a mouse over event is generated at a position on which any one (any one of 1021 through 1025) of one or more distribution objects (1021 through 1025) is displayed in the grouping and monitoring region 980, detailed information 1026 on the distribution object (for example, 1025) in which a mouse over event is generated may be displayed. The detailed information 1026 on the distribution object (for example, 1025) may include at least one of a title, network information, an output type, a memory size of the distribution object and a title of the content being outputted.

The input unit 310 selects a distribution object for distributing contents among one or more distribution objects displayed in a distribution object selection region of the content according to the user's request. For example, when in the management mode, one content (for example, 1012) of one or more contents displayed in a contents selection region 1010 may be selected as a content to be distributed.

If an input for selecting a distribution object for distributing the selected content among one or more distribution objects displayed in a distribution object selection region of the content is received through the input unit 310, then the selected content is transmitted to the selected distribution object through the communication unit 360 (S512). The input for selecting the distribution object may be an input based on a drag-and-drop signal to drag-and-drop the selected content to the distribution object.

If a drag-and-drop signal to any one of one or more distribution objects displayed in the distribution object selection region 980 is received from the content 1012 selected from one or more contents displayed in the content selection region 1010, then the selected content may be transmitted to the selected distribution object.

The display unit 340 may display a transmission state of the transmitted content (S513). Here the selected distribution object (display device) may inform the controller 330 of a transmission state of the content transmitted from the controller 330.

On the other hand, the apparatus of controlling a digital signage apparatus and the method thereof according to embodiments of the present invention may be configured with a hardware, or may be configured with a medium (for example, optical disk, memory, etc.) having information for displaying content files, displaying a first content file selected from the content files in a time cell region of a scheduler, and scheduling the selected first content file through the scheduler.

As a result, the apparatus of controlling a digital signage apparatus and the method thereof according to still another embodiment of the present invention may simplify a process required for contents distribution in an edit and management window of the contents and visualize information required for the management of contents and display devices, thereby enhancing the user's convenience and providing an intuitive user interface (UI). As a result, the user can systematically manage various contents and dispersed display devices. In particular, when speedy and accurate contents distribution and management is required in the aspect of scheduling management of advertisement, such a provision of UI may allow the user to enhance the efficiency of work, thereby maximizing the utility of a digital signage apparatus.

It will be apparent to those skilled in this art that various changes and modifications may be made thereto without departing from the gist of the present invention. Accordingly, it should be noted that the embodiments disclosed in the present invention are only illustrative and not limitative to the spirit of the present invention, and the scope of the spirit of the invention is not limited by those embodiments. The scope protected by the present invention should be construed by the accompanying claims, and all the spirit within the equivalent scope of the invention should be construed to be included in the scope of the right of the present invention.

The invention claimed is:

1. A control device of a digital signage apparatus, the device comprising:
    a first display unit configured to display contents;
    and a controller configured to:
        display an image representing a first content selected from the contents on a time cell region of a scheduler displayed on the first display unit,
        set up a display duration of the first content,
        transmit the first content that was selected from the contents on the time cell region of the scheduler to a second display unit through a communication network,
        display the first content on the second display unit during the display duration, wherein the scheduler schedules the selected first content,
        edit the display duration of the first content to be displayed on the second display unit by adjusting a size of the image displayed on the time cell region of the scheduler, and
        display the first content on the second display unit during the edited display duration.

2. The device of claim 1, wherein the controller moves the selected first content to a specific location within the time cell region.

3. The device of claim 2, wherein the specific location within the time cell region indicates a specific date and a specific time within the time cell region.

4. The device of claim 1, wherein the controller sets up the display duration by adjusting a size of the time cell region in which the first content is located.

5. The device of claim 1, wherein the controller displays a thumbnail image and/or summary information on the first content within the time cell region.

6. The device of claim 5, wherein the summary information comprises at least one of a player name, a type of the player, a resolution of the player, a size of the player, a kind of library, a title of content, a resolution of the content, a size of the content, a play time of the content, and a creation date of the content.

7. The device of claim 1, wherein the controller disables a time cell region prior to a current date among a plurality of dates included in the time cell region.

8. The device of claim 1, wherein the controller displays date and time information on the first display unit if the first content displayed within the time cell region is selected, and displays the first content in a time cell region corresponding to the selected first date and first time information if first date and first time information is selected from the displayed date and time information.

9. The device of claim 1, wherein the controller is further configured to:
 display content information on a time cell region of the scheduler, and
 display an edit window for editing a content corresponding to the content information on the first display unit when the content information is selected.

10. The device of claim 9, wherein the content information comprises at least any one of an icon indicating the repeat play of the content, a representative image of the content, an icon indicating the type of the content, a title of the content, a play time of the content, and an extended play time of the content.

11. The device of claim 9, wherein the edit window for editing the content comprises at least any one of: a tool region for editing the content; a time line for setting up a play time of the content; a picture region for displaying a picture related to the content; a moving image region for displaying a moving image related to the content; an information region indicating information related to the content; a background region indicating a background of the content; and a deletion region for deleting the content.

12. The device of claim 1, wherein the controller is further configured to:
 display an edit region of the first content and a distribution object selection region of the first content on the scheduler, and
 transmit the first content to a first distribution object of one or more distribution objects displayed on the distribution object selection region of the first content through the communication unit.

13. The device of claim 12, wherein the controller displays a transmission state of the first content on the first display unit when transmitting the first content.

14. A method of controlling a digital signage apparatus, the method comprising:
 displaying contents on a first display unit;
 displaying an image representing a first content selected from the contents on a time cell region of a scheduler displayed on the first display unit, wherein the scheduler schedules the selected first content;
 setting up a display duration of the first content;
 transmitting the first content that was selected from the content on the time cell region of the scheduler to a second display unit through a communication network;
 displaying the first content transmitted through the communication network on the second display unit during the display duration;
 editing the display duration of the first content to be displayed on the second display unit by adjusting a size of the image displayed on the time cell region of the scheduler;
 and displaying the first content on the second display unit during the edited display duration.

15. The method of claim 14, wherein said displaying the first content comprises moving the selected first content to a specific location within the time cell region, wherein the specific location within the time cell region indicates a specific date and a specific time within the time cell region.

16. The method of claim 14, wherein said setting up the display duration is setting up the display duration by adjusting a size of the time cell region in which the first content is located.

17. The method of claim 14, wherein said displaying the first content comprises displaying a thumbnail image and/or summary information on the first content within the time cell region.

18. The method of claim 14, further comprising: disabling a time cell region prior to a current date among a plurality of dates included in the time cell region.

19. The method of claim 14, further comprising:
 displaying date and time information on the first display unit if the first content displayed within the time cell region is selected;
 and displaying the first content in a time cell region corresponding to the selected first date and first time information if first date and first time information is selected from the displayed date and time information.

* * * * *